United States Patent
Wade

(10) Patent No.: US 11,755,103 B2
(45) Date of Patent: Sep. 12, 2023

(54) USING PREDICTION INFORMATION WITH LIGHT FIELDS

(71) Applicant: Shopify Inc., Ottawa (CA)

(72) Inventor: Jonathan Wade, Ottawa (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 17/722,034

(22) Filed: Apr. 15, 2022

(65) Prior Publication Data

US 2022/0236792 A1 Jul. 28, 2022

Related U.S. Application Data

(63) Continuation of application No. 17/246,358, filed on Apr. 30, 2021, now Pat. No. 11,334,149, which is a continuation of application No. 16/557,329, filed on Aug. 30, 2019, now Pat. No. 11,029,755.

(51) Int. Cl.
*G06F 3/01* (2006.01)
*G06T 15/08* (2011.01)
*G06Q 30/0601* (2023.01)
*G06N 20/00* (2019.01)
*G06T 15/20* (2011.01)

(52) U.S. Cl.
CPC ............. *G06F 3/012* (2013.01); *G06N 20/00* (2019.01); *G06Q 30/0641* (2013.01); *G06T 15/08* (2013.01); *G06T 15/20* (2013.01)

(58) Field of Classification Search
CPC ..... G06T 15/08; G06T 15/20; G06Q 30/0641; G06F 3/012; G06F 3/011; G06F 3/0346; G06F 3/013; G06N 20/00; G06V 20/20; H04N 13/388; H04N 13/25
See application file for complete search history.

(56) References Cited

U.S. PATENT DOCUMENTS

| | | | |
|---|---|---|---|
| 10,565,773 | B1 | 2/2020 | Tytgat |
| 10,706,621 | B2 | 7/2020 | Von Cramon |
| 10,852,838 | B2 | 12/2020 | Bradski et al. |
| 11,029,755 | B2 | 6/2021 | Wade |
| 2012/0188344 | A1 | 7/2012 | Imai |
| 2015/0154774 | A1 | 6/2015 | Kolhi et al. |
| 2015/0208060 | A1 | 7/2015 | Kim et al. |

(Continued)

OTHER PUBLICATIONS

U.S. Appl. No. 16/557,267 , "U.S. Appl. No. 16/557,267, Final Office Action dated Feb. 4, 2021", Jonathan Wade, 17 pages.

(Continued)

*Primary Examiner* — Xilin Guo
(74) *Attorney, Agent, or Firm* — Moffat & Co

(57) ABSTRACT

An example process executed by a processor of a computing device to communicate a first light field data to a user device, wherein the first light field data is limited to a first volume of space that represents a first plurality of views for display on the user device; receive a sensor data associated with the user device; predict a behavior based at least in part from the received sensor data; generate a second light field data based at least in part on the predicted behavior, wherein the second light field data is limited to a second volume of space that is different from the first volume of space and represents a second plurality of views for display on the user device; and communicate the second light field data to the user device.

20 Claims, 10 Drawing Sheets

(56) References Cited

U.S. PATENT DOCUMENTS

| | | | |
|---|---|---|---|
| 2016/0021355 | A1 | 1/2016 | Alpaslan et al. |
| 2016/0306390 | A1 | 10/2016 | Vertegaal et al. |
| 2017/0061700 | A1 | 3/2017 | Urbach et al. |
| 2017/0099479 | A1 | 4/2017 | Browd et al. |
| 2017/0123487 | A1 | 5/2017 | Hazra et al. |
| 2017/0142427 | A1 | 5/2017 | Graziosi et al. |
| 2017/0243373 | A1 | 8/2017 | Bevensee et al. |
| 2017/0287220 | A1 | 10/2017 | Khalid et al. |
| 2018/0096494 | A1 | 4/2018 | Zhou |
| 2018/0136486 | A1 | 5/2018 | Macnamara et al. |
| 2018/0275410 | A1 | 9/2018 | Yeoh et al. |
| 2018/0350136 | A1* | 12/2018 | Rowley .................. G06T 7/73 |
| 2018/0352254 | A1 | 12/2018 | Alpaslan et al. |
| 2019/0094981 | A1 | 3/2019 | Bradski et al. |
| 2019/0124313 | A1 | 4/2019 | Li et al. |
| 2019/0198576 | A1* | 6/2019 | Schubert ............. H01L 51/5265 |
| 2019/0340306 | A1 | 11/2019 | Harrison et al. |
| 2019/0362151 | A1 | 11/2019 | Stokking et al. |
| 2019/0369752 | A1* | 12/2019 | Ikeda .................... G06F 3/0346 |
| 2019/0394488 | A1 | 12/2019 | Alpaslan et al. |
| 2020/0106959 | A1* | 4/2020 | Molina ................ H04N 13/106 |
| 2021/0064124 | A1 | 3/2021 | Wade |
| 2021/0065427 | A1 | 3/2021 | Wade |
| 2021/0065428 | A1 | 3/2021 | Wade |
| 2021/0255697 | A1 | 8/2021 | Wade |

OTHER PUBLICATIONS

U.S. Appl. No. 16/557,267, "U.S. Appl. No. 16/557,267, Final Office Action dated Oct. 28, 2021", Jonathan Wade, 19 pages.

U.S. Appl. No. 16/557,267, "U.S. Appl. No. 16/557,267, Non-Final Office Action dated Feb. 22, 2022", Jonathan Wade, 26 pages.

U.S. Appl. No. 16/557,267, "U.S. Appl. No. 16/557,267, Non-Final Office Action dated Jun. 24, 2021", Jonathan Wade, 18 pages.

U.S. Appl. No. 16/557,267, "U.S. Appl. No. 16/557,267, Non-Final Office Action dated Oct. 23, 2020", Jonathan Wade, 19 pages.

U.S. Appl. No. 16/557,300, "U.S. Appl. No. 16/557,300, Advisory Action dated Sep. 22, 2021", Jonathan Wade, 3 pages.

U.S. Appl. No. 16/557,300, "U.S. Appl. No. 16/557,300, Final Office Action dated Jul. 14, 2021", Jonathan Wade, 12 pages.

U.S. Appl. No. 16/557,300, "U.S. Appl. No. 16/557,300, Non-Final Office Action dated Jan. 7, 2021", Jonathan Wade, 10 pages.

U.S. Appl. No. 16/557,300, "U.S. Appl. No. 16/557,300, Non-Final Office Action dated Dec. 13, 2021", Jonathan Wade, 13 pages.

U.S. Appl. No. 16/557,329, "U.S. Appl. No. 16/557,329, Corrected Notice of Allowability dated Apr. 19, 2021", Jonathan Wade, 5 pages.

U.S. Appl. No. 16/557,329, "U.S. Appl. No. 16/557,329, Corrected Notice of Allowability dated Apr. 30, 2021", Jonathan Wade, 5 pages.

U.S. Appl. No. 16/557,329, "U.S. Appl. No. 16/557,329, Non-Final Office Action dated Oct. 9, 2020", Jonathan Wade, 23 pages.

U.S. Appl. No. 16/557,329, "U.S. Appl. No. 16/557,329, Notice of Allowance dated Feb. 3, 2021", Jonathan Wade, 11 pages.

U.S. Appl. No. 17/246,358, "U.S. Appl. No. 17/246,358, Notice of Allowance dated Feb. 16, 2022", Jonathan Wade, 11 pages.

20185574.9, "European Application Serial No. 20185574.9, Extended European Search Report dated Jan. 18, 2021", Shopify Inc., 10 pages.

202024033548, "Indian Application Serial No. 202024033548, Examination Report dated Sep. 24, 2021", Shopify Inc., 6 pages.

Wu, Gaochang, et al., "Light Field Image Processing: An Overview", IEEE Journal of Selected Topics in Signal Processing, vol. 11, No. 7, 2017, pp. 926-954.

European Patent Application No. 20 185 574.9, Examination Report, dated Sep. 27, 2022, pp. 1-8.

* cited by examiner

FIG. 2

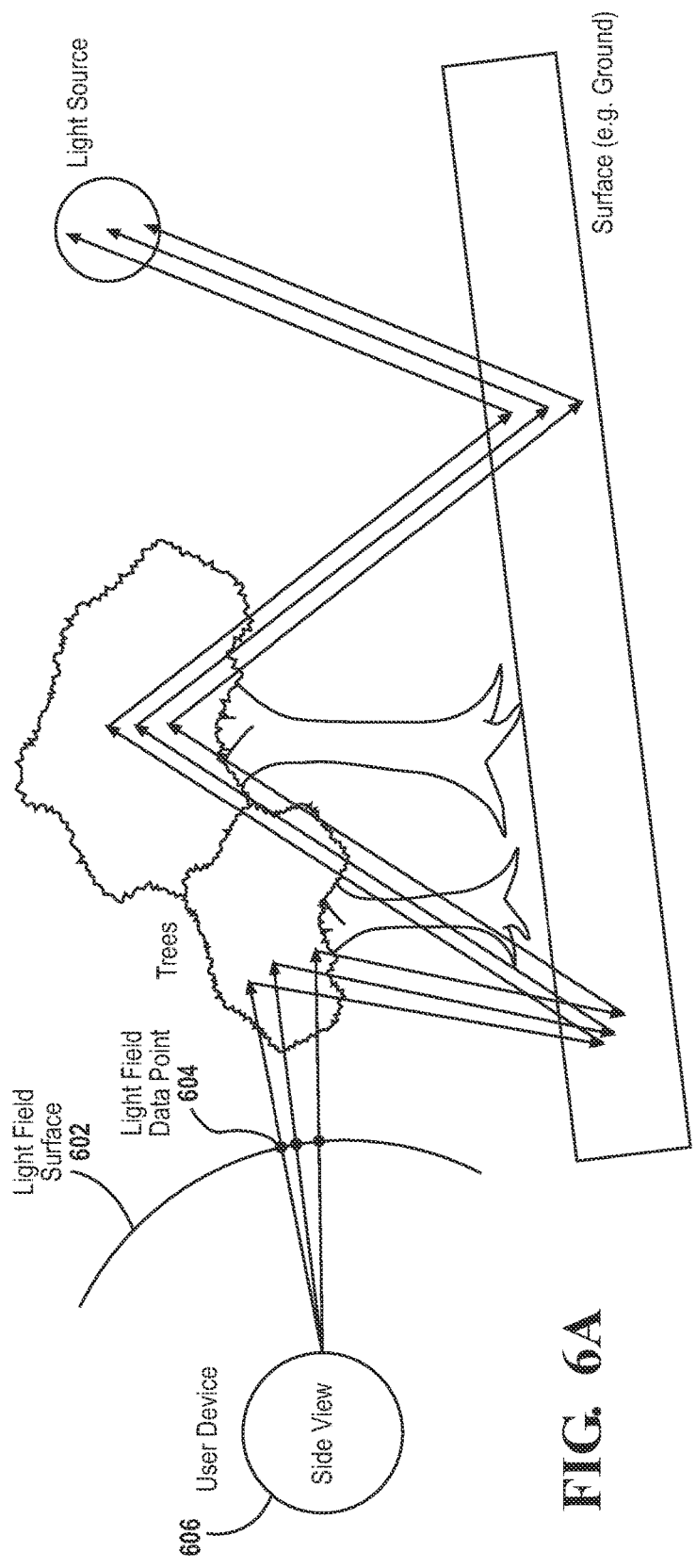
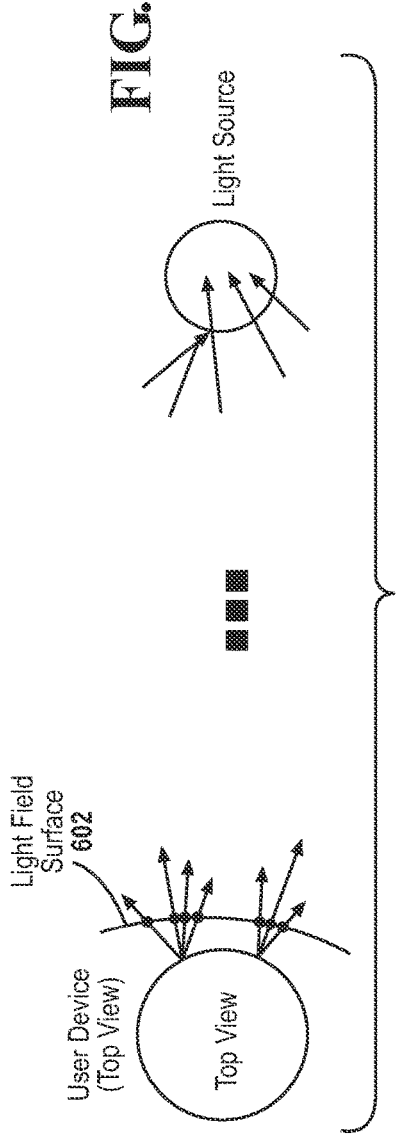
FIG. 6A
FIG. 6B

USING PREDICTION INFORMATION WITH LIGHT FIELDS

CLAIM TO PRIORITY

The present application is a continuation of U.S. patent application Ser. No. 17/246,358, filed Apr. 30, 2021, and entitled "USING PREDICTION INFORMATION WITH LIGHT FIELDS".

U.S. patent application Ser. No. 17/246,358 is a continuation of U.S. patent application Ser. No. 16/557,329, filed Aug. 30, 2019, and entitled "USING PREDICTION INFORMATION WITH LIGHT FIELDS".

Each of the foregoing applications is hereby incorporated by reference in its entirety for all purposes.

FIELD

The present disclosure relates generally to communication of visual content to a user device, and more specifically to communication of visual content in response to an action in association with the user device.

BACKGROUND

Interactive systems that include visual content are often implemented with some image processing functions performed remotely from the user device. As a result, for real time applications there is a lag in the delivery of continuous visual content (e.g., streaming of visual content where the scene is changing) or in response to user device inputs (e.g., a scene change due to an input received from the user device, such as between a data input resulting from a user response to the presentation of a first visual content and the presentation of a second visual content that is responsive to the data input). This lag may be due to communication time between the user device and the remote image processing facility, the image processing time for generating the second visual content, and the like. This lag can cause unintended consequences with respect to a user experience, such as where the user consciously senses the lag (e.g., the user sensing that the image content update is slow or discontinuous) or unconsciously senses the lag (e.g., causing motion sickness). There is a need for methods and systems that reduce the perceived lag between consecutive displays of visual content in a visual-based interactive system.

SUMMARY

In an aspect, a method may include communicating, by a computing device, a light field data to a user device, wherein the light field data comprises a visual content greater than a display field of view of the user device. In embodiments, the visual content greater than a display field of view of the user device may be at the time of communication of the light field data. The visual content greater than a display field of view of the user device may be at the expected time of receipt of the light field data. The light field data may include a three-dimensional volume describing the light flowing in a plurality of directions through a plurality of light field data points. The light field data may be communicated to the user device for display as virtual reality, augmented reality, or mixed reality content. The processor adapted to process light field data may generate display data from the light field data. The user device may be communicatively coupled to a display for presentation of the display data. The light field data may include a three-dimensional volume of light field data points. The three-dimensional volume may be omnidirectional with respect to the user device as an origin. The three-dimensional volume may be a partial volume with respect to the user device as an origin. The partial volume may have a field of view characteristic. The three-dimensional volume may be a partial volume with respect to a determined direction of motion of the user device. The light field data may be based on a data model for light characterization in a volume of space.

In an aspect, a system may include a computing device associated with an image processor, the computing device configured to store a set of instructions that, when executed, cause the computing device to communicate a light field data to a user device, the user device comprising a processor adapted to process light field data, wherein the light field data comprises a visual content greater than a display field of view of the user device. In embodiments, the visual content greater than a display field of view of the user device may be at the time of communication of the light field data. The visual content greater than a display field of view of the user device may be at the expected time of receipt of the light field data. The light field data may include a three-dimensional volume describing the light flowing in a plurality of directions through a plurality of light field data points. The light field data may be communicated to the user device for display as virtual reality, augmented reality, or mixed reality content. The processor adapted to process light field data may generate display data from the light field data. The user device may be communicatively coupled to a display for presentation of the display data. The light field data may include a three-dimensional volume of light field data points. The three-dimensional volume may be omnidirectional with respect to the user device as an origin. The three-dimensional volume may be a partial volume with respect to the user device as an origin. The partial volume may have a field of view characteristic. The three-dimensional volume may be a partial volume with respect to a determined direction of motion of the user device. The light field data may be based on a data model for light characterization in a volume of space.

In an aspect, a method may include communicating, by a computing device, a first light field data to a user device, the user device comprising a processor adapted to process light field data; receiving, by the computing device, a sensor data associated with the user device; and communicating, by the computing device, a second light field data, based at least in part on the sensor data, to the user device. In embodiments, the light field data may include a three-dimensional volume describing the light flowing in a plurality of directions through a plurality of light field data points. The first light field data may include a first surface volume in a surrounding environment with respect to the user device, and the second light field data may include a second surface volume in a surrounding environment with respect to the user device. The light field data may be communicated to the user device for display as virtual reality, augmented reality, or mixed reality content. The sensor data may represent a change in a viewing perspective with respect to the virtual reality, augmented reality, or mixed reality content. The user device may be a head-mounted device and the sensor data may represent a motion of the head-mounted device. The user device may be a wearable device and the sensor data may represent a motion of the wearable device. The user device may be a hand-held device and the sensor data may represent a motion of the hand-held device. The sensor data may further represent a motion of a head-mounted device. The processor adapted to process light field data may generate display data from the light field data. The user device may be communicatively coupled to a display for presentation of the display data. The sensor data may include a position sensor data or motion sensor data. The light field data may include a three-dimensional volume of light field data points. The three-dimensional volume may change from the first light field data to the second light field data. The three-dimensional volume may be omnidirectional with respect to the user device as an origin. The three-dimensional volume may be a partial volume with respect to the user device as an origin. The partial volume may have a field of view characteristic. The three-dimensional volume may be a partial volume with respect to a determined direction of motion of the user device. The first light field data may include a first light field spatial volume, and the second light field data may include a second light field spatial volume that is adjusted in size based on the received sensor data. The light field data may be based on a data model for light characterization in a volume of space.

In an aspect, a system may include a computing device associated with an image processor, the computing device configured to store a set of instructions that, when executed, cause the computing device to: communicate a first light field data to a user device, the user device comprising a processor adapted to process light field data; receive a sensor data associated with the user device; and communicate a second light field data, based at least in part on the sensor data, to the user device. In embodiments, the light field data may include a three-dimensional volume describing the light flowing in a plurality of directions through a plurality of light field data points. The first light field data may include a first surface volume in a surrounding environment with respect to the user device, and the second light field data may include a second surface volume in a surrounding environment with respect to the user device. The light field data may be communicated to the user device for display as virtual reality, augmented reality, or mixed reality content. The sensor data may represent a change in a viewing perspective with respect to the virtual reality, augmented reality, or mixed reality content. The user device may be a head-mounted device and the sensor data may represent a motion of the head-mounted device. The user device may be a wearable device and the sensor data may represent a motion of the wearable device. The user device may be a hand-held device and the sensor data may represent a motion of the hand-held device. The sensor data may further represent a motion of a head-mounted device. The processor adapted to process light field data may generate display data from the light field data. The user device may be communicatively coupled to a display for presentation of the display data. The sensor data may include a position sensor data or motion sensor data. The light field data may include a three-dimensional volume of light field data points. The three-dimensional volume may change from the first light field data to the second light field data. The three-dimensional volume may be omnidirectional with respect to the user device as an origin. The three-dimensional volume may be a partial volume with respect to the user device as an origin. The partial volume may have a field of view characteristic. The three-dimensional volume may be a partial volume with respect to a determined direction of motion of the user device. The first light field data may include a first light field spatial volume, and the second light field data may include a second light field spatial volume that is adjusted in size based on the received sensor data. The light field data may be based on a data model for light characterization in a volume of space.

In aspect, a method may include receiving at a computing device a sensor data associated with a user device, the user device comprising a processor adapted to process light field data; and communicating light field data, based at least in part on the sensor data, to the user device. In embodiments, the light field data may include a three-dimensional volume describing the light flowing in a plurality of directions through a plurality of light field data points. The light field data may be communicated to the user device for display as virtual reality, augmented reality, or mixed reality content. The sensor data may represent a viewing perspective with respect to the virtual reality, augmented reality, or mixed reality content. The user device may be a head-mounted device and the sensor data may represent a motion of the head-mounted device. The user device may be a wearable device and the sensor data may represent a motion of the wearable device. The user device may be a hand-held device and the sensor data may represent a motion of the hand-held device. The sensor data may further represent a motion of a head-mounted device. The processor adapted to process light field data may generate display data from the light field data. The user device may be communicatively coupled to a display for presentation of the display data. The sensor data may include position sensor data. The sensor data may include motion sensor data. The light field data may include a three-dimensional volume of light field data points. The three-dimensional volume may be omnidirectional with respect to the user device as an origin. The three-dimensional volume may be a partial volume with respect to the user device as an origin. The partial volume may have a field of view characteristic. The three-dimensional volume may be a partial volume with respect to a determined direction of motion of the user device. The light field data may be based on a data model for light characterization in a volume of space.

In an aspect, a system may include a computing device associated with an image processor, the computing device configured to store a set of instructions that, when executed, cause the computing device to: receive a sensor data associated with a user device, the user device comprising a processor adapted to process light field data; and communicate light field data, based at least in part on the sensor data, to the user device. In embodiments, the light field data may include a three-dimensional volume describing the light flowing in a plurality of directions through a plurality of light field data points. The light field data may include a three-dimensional volume describing the light flowing in a plurality of directions through a plurality of light field data points. The light field data may be communicated to the user device for display as virtual reality, augmented reality, or mixed reality content. The sensor data may represent a viewing perspective with respect to the virtual reality, augmented reality, or mixed reality content. The user device may be a head-mounted device and the sensor data may represent a motion of the head-mounted device. The user device may be a wearable device and the sensor data may represent a motion of the wearable device. The user device may be a hand-held device and the sensor data may represent a motion of the hand-held device. The sensor data may further represent a motion of a head-mounted device. The processor adapted to process light field data may generate display data from the light field data. The user device may be communicatively coupled to a display for presentation of the display data. The sensor data may include position sensor data. The sensor data may include motion sensor data. The light field data may include a three-dimensional volume of light field data points. The three-dimensional volume may be omnidirectional with respect to the user device as an origin. The three-dimensional volume may be a partial volume with respect to the user device as an origin. The partial volume may have a field of view characteristic. The three-dimensional volume may be a partial volume with respect to a determined direction of motion of the user device. The light field data may be based on a data model for light characterization in a volume of space.

In an aspect, a method may include receiving a light field data by a user device, wherein the light field data comprises a visual content greater than a display field of view of the user device. In embodiments, the light field data may include a three-dimensional volume describing the light flowing in a plurality of directions through a plurality of light field data points. The light field data may be displayed on the user device for display as virtual reality, augmented reality, or mixed reality content. The user device may be adapted to process light field data to generate display data from the light field data. The user device may be communicatively coupled to a display for presentation of the display data. The light field data may include a three-dimensional volume of light field data points. The light field data may be based on a data model for light characterization in a volume of space.

In an aspect, a system may include a user device, the user device configured to store a set of instructions that, when executed, cause the user device to receive a light field data, wherein the light field data may include a visual content greater than a display field of view of the user device. In embodiments, the light field data may include a three-dimensional volume describing the light flowing in a plurality of directions through a plurality of light field data points. The light field data may be displayed on the user device for display as virtual reality, augmented reality, or mixed reality content. The user device may be adapted to process light field data to generate display data from the light field data. The user device may be communicatively coupled to a display for presentation of the display data. The light field data may include a three-dimensional volume of light field data points. The light field data may be based on a data model for light characterization in a volume of space.

In an aspect, a method may include receiving a first light field data by a user device, the user device comprising a processor adapted to process light field data; communicating a sensor data associated with the user device; and receiving a second light field data, based at least in part on the sensor data, by the user device. In embodiments, the light field data may include a three-dimensional volume describing the light flowing in a plurality of directions through a plurality of light field data points. The light field data may be displayed by the user device as virtual reality, augmented reality, or mixed reality content. The sensor data may include a position sensor data or motion sensor data. The first light field data may include a first light field spatial volume, and the second light field data may include a second light field spatial volume that is adjusted in size based on the communicated sensor data.

In an aspect, a system may include a user device, the user device configured to store a set of instructions that, when executed, cause the user device to receive a first light field data by a user device, the user device comprising a processor adapted to process light field data; communicate a sensor data associated with the user device; and receive a second light field data, based at least in part on the sensor data, by the user device. In embodiments, the light field data may include a three-dimensional volume describing the light flowing in a plurality of directions through a plurality of light field data points. The light field data may be displayed by the user device as virtual reality, augmented reality, or mixed reality content. The sensor data may include a position sensor data or motion sensor data. The first light field data may include a first light field spatial volume, and the second light field data may include a second light field spatial volume that is adjusted in size based on the communicated sensor data.

In an aspect, a method may include communicating a sensor data by a user device; and receiving light field data, based at least in part on the sensor data, by the user device. In embodiments, the light field data may include a three-dimensional volume describing the light flowing in a plurality of directions through a plurality of light field data points. The light field data may be displayed by the user device as virtual reality, augmented reality, or mixed reality content. The user device may include a head-mounted device and the sensor data may represent a motion of the head-mounted device. The user device may include a wearable device and the sensor data may represent a motion of the wearable device. The user device may include a hand-held device and the sensor data may represent a motion of the hand-held device. The user device may be adapted to process light field data to generate display data from the light field data. The sensor data may include position sensor data. The sensor data may include motion sensor data. The light field data may include a three-dimensional volume of light field data points. The three-dimensional volume may be a partial volume with respect to a determined direction of motion of the user device. The light field data may be based on a data model for light characterization in a volume of space.

In an aspect, a system may include a user device, the user device configured to store a set of instructions that, when executed, cause the user device to communicate a sensor data by a user device; and receive light field data, based at least in part on the sensor data, by the user device. In embodiments, the light field data may include a three-dimensional volume describing the light flowing in a plurality of directions through a plurality of light field data points. The light field data may be displayed by the user device as virtual reality, augmented reality, or mixed reality content. The user device may include a head-mounted device and the sensor data may represent a motion of the head-mounted device. The user device may include a wearable device and the sensor data may represent a motion of the wearable device. The user device may include a hand-held device and the sensor data may represent a motion of the hand-held device. The user device may be adapted to process light field data to generate display data from the light field data. The sensor data may include position sensor data. The sensor data may include motion sensor data. The light field data may include a three-dimensional volume of light field data points. The three-dimensional volume may be a partial volume with respect to a determined direction of motion of the user device. The light field data may be based on a data model for light characterization in a volume of space.

In an aspect, a method may include communicating a sensor data associated with a user device, the user device comprising a processor adapted to process light field data, and receiving light field data, based at least in part on the sensor data, by the user device. In embodiments, the light field data may include a three-dimensional volume describing the light flowing in a plurality of directions through a plurality of light field data points.

In an aspect, a system may include a user device configured to store a set of instructions that, when executed, cause the user device to communicate a sensor data associated with a user device, the user device comprising a processor adapted to process light field data, and receive light field data, based at least in part on the sensor data, by the user device. In embodiments, the light field data may include a three-dimensional volume describing the light flowing in a plurality of directions through a plurality of light field data points.

In an aspect, a method for a user device may include receiving, from a computing device, a light field data generated by the computing device, the light field data representing a portion of a viewed scene by the user device, wherein the light field data comprises a three-dimensional volume describing the light flowing in a plurality of directions through a plurality of light field data points. In embodiments, the user device may be configured to display augmented reality or mixed reality content where the portion of the viewed scene is presented against a surrounding environment viewed on the user device. The portion of the viewed scene may remain fixed with reference to the surrounding environment. The portion of the viewed scene may be oriented with respect to an object. The object may be a virtual object presented against the surrounding environment as viewed through the user device. The object may be a real object in the surrounding environment as viewed through the user device. The light field data may be generated with respect to a resolution constraint. The resolution constraint may be with respect to a number of light field vectors for each of the plurality of light field data points. The resolution constraint may be with respect to a density function of the plurality of light field data points. The density function may be with respect to a field of view of the portion of the viewed scene. The resolution constraint may be with respect to a direction function of light field vectors within the portion of the viewed scene. The light field data may be generated with low resolution light fields and high resolution light fields representing the portion of the viewed scene. The user device may be communicatively coupled to a display for presentation of display data.

In an aspect, a system may include a user device, the user device configured to store a set of instructions that, when executed, cause the user device to receive from a computing device a light field data generated by the computing device, the light field data representing a portion of a viewed scene by the user device, wherein the light field data comprises a three-dimensional volume describing the light flowing in a plurality of directions through a plurality of light field data points. In embodiments, the user device may be configured to display augmented reality or mixed reality content where the portion of the viewed scene is presented against a surrounding environment viewed on the user device. The portion of the viewed scene may remain fixed with reference to the surrounding environment. The portion of the viewed scene may be oriented with respect to an object. The object may be a virtual object presented against the surrounding environment as viewed through the user device. The object may be a real object in the surrounding environment as viewed through the user device. The light field data may be generated with respect to a resolution constraint. The resolution constraint may be with respect to a number of light field vectors for each of the plurality of light field data points. The resolution constraint may be with respect to a density function of the plurality of light field data points. The density function may be with respect to a field of view of the portion of the viewed scene. The resolution constraint may be with respect to a direction function of light field vectors within the portion of the viewed scene. The light field data may be generated with low resolution light fields and high resolution light fields. The user device may be communicatively coupled to a display for presentation of display data.

In an aspect, a method may include receiving, from a computing device, a light field data representing a portion of a viewed scene by a user device, wherein the portion of the viewed scene describes a location-based portion of a three-dimensional volume in a surrounding environment of the user device. In embodiments, the light field data may include a three-dimensional volume describing the light flowing in a plurality of directions through a plurality of light field data points. The user device may be configured to present augmented reality or mixed reality content where the portion of the viewed scene is displayed against the surrounding environment viewed on the user device. The portion of the viewed scene may remain fixed with reference to the surrounding environment. The portion of the viewed scene may be oriented with respect to an object. The object may be a virtual object presented against the surrounding environment as viewed on the user device. The object may be a real object in the surrounding environment as viewed on the user device. The light field data may be generated with respect to a resolution constraint. The resolution constraint may be with respect to a number of light field vectors for each of a plurality of light field data points. The resolution constraint may be with respect to a density function of a plurality of light field points. The density function may be with respect to a field of view of the portion of the viewed scene. The resolution constraint may be with respect to a direction function of light field vectors within the portion of the viewed scene. The light field data may be generated with low resolution light fields and high resolution light fields. The user device may be communicatively coupled to a display for presentation of display data.

In an aspect, a system may include a user device, the user device configured to store a set of instructions that, when executed, cause the user device to receive from a computing device a light field data representing a portion of a viewed scene by a user device, wherein the portion of the viewed scene describes a location-based portion of a three-dimensional volume in a surrounding environment of the user device. In embodiments, the light field data may include a three-dimensional volume describing the light flowing in a plurality of directions through a plurality of light field data points. The user device may be configured to present augmented reality or mixed reality content where the portion of the viewed scene is displayed against the surrounding environment viewed on the user device. The portion of the viewed scene may remain fixed with reference to the surrounding environment. The portion of the viewed scene may be oriented with respect to an object. The object may be a virtual object presented against the surrounding environment as viewed on the user device. The object may be a real object in the surrounding environment as viewed on the user device. The light field data may be generated with respect to a resolution constraint. The resolution constraint may be with respect to a number of light field vectors for each of a plurality of light field data points. The resolution constraint may be with respect to a density function of a plurality of light field points. The density function may be with respect to a field of view of the portion of the viewed scene. The resolution constraint may be with respect to a direction function of light field vectors within the portion of the viewed scene. The light field data may be generated with low resolution light fields and high resolution light fields. The user device may be communicatively coupled to a display for presentation of display data.

In an aspect, a method may include generating, by a computing device, a light field data, wherein the light field data comprises a three-dimensional volume describing the light flowing in a plurality of directions through a plurality of light field data points; and communicating, by the computing device, the light field data and location information to the user device, a user device comprising a processor adapted to process light field data, wherein the location information describes a location-based portion of a three-dimensional volume in a surrounding environment of the user device. In embodiments, the user device may be configured to present augmented reality or mixed reality content where the location information identifies a region of the surrounding environment for processing of display data as presented against the surrounding environment viewed by the user device. The region of the surrounding environment may remain fixed with reference to the surrounding environment. The region of the surrounding environment may remain fixed with reference to the user device. A region of the surrounding environment may be oriented with respect to an object. The object may be a virtual object presented against the surrounding environment as viewed through the user device. The object may be a real object in the surrounding environment as viewed through the user device. The light field data may be generated with respect to a resolution constraint. The resolution constraint may be with respect to a number of light field vectors for each of the plurality of light field data points. The resolution constraint may be with respect to a density function of the plurality of light field points. The density function may be with respect to a field of view of the portion of a viewed scene. The resolution constraint may be with respect to a direction function of light field vectors within the portion of a viewed scene. The light field data may be generated with resolution stitches with low resolution light fields and high resolution light fields. The user device may be communicatively coupled to a display for presentation of display data.

In an aspect, a system may include a computing device associated with an image processor, the computing device configured to store a set of instructions that, when executed, cause the computing device to generate a light field data, wherein the light field data comprises a three-dimensional volume describing the light flowing in a plurality of directions through a plurality of light field data points; and communicate the light field data and location information to the user device, a user device comprising a processor adapted to process light field data, wherein the location information describes a location-based portion of a three-dimensional volume in a surrounding environment of the user device. In embodiments, the user device may be configured to present augmented reality or mixed reality content where the location information identifies a region of the surrounding environment for processing of display data as presented against the surrounding environment viewed by the user device. The region of the surrounding environment may remain fixed with reference to the surrounding environment. The region of the surrounding environment may remain fixed with reference to the user device. A region of the surrounding environment may be oriented with respect to an object. The object may be a virtual object presented against the surrounding environment as viewed through the user device. The object may be a real object in the surrounding environment as viewed through the user device. The light field data may be generated with respect to a resolution constraint. The resolution constraint may be with respect to a number of light field vectors for each of the plurality of light field data points. The resolution constraint may be with respect to a density function of the plurality of light field points. The density function may be with respect to a field of view of the portion of a viewed scene. The resolution constraint may be with respect to a direction function of light field vectors within the portion of a viewed scene. The light field data may be generated with resolution stitches with low resolution light fields and high resolution light fields. The user device may be communicatively coupled to a display for presentation of display data.

In an aspect, a method may include communicating to a user device a light field data and location information, the user device comprising a processor adapted to process the light field data; and processing, by the user device, the light field data to represent a portion of a viewed scene by the user device based on the location information, wherein the portion of the viewed scene describes a location-based portion of a three-dimensional volume in a surrounding environment of the user device. In embodiments, the light field data may include a three-dimensional volume describing the light flowing in a plurality of directions through a plurality of light field data points. The user device may be configured to present augmented reality or mixed reality content where the portion of the viewed scene is presented against the surrounding environment viewed by the user device. The portion of the viewed scene may remain fixed with reference to the surrounding environment. The portion of the viewed scene may be oriented with respect to an object. The object may be a virtual object presented against the surrounding environment as viewed through the user device. The object may be a real object in the surrounding environment as viewed through the user device. The light field data may be generated with respect to a resolution constraint. The resolution constraint may be with respect to a number of light field vectors for each of a plurality of light field data points. The resolution constraint may be with respect to a density function of a plurality of light field data points. The density function may be with respect to a field of view of the portion of the viewed scene. The resolution constraint may be with respect to a direction function of light field vectors within the portion of the viewed scene. The light field data may be generated with resolution stitches with low resolution light fields and high resolution light fields representing the portion of the viewed scene. The user device may be communicatively coupled to a display for presentation of display data.

In an aspect, a system may include a computing device associated with an image processor, the computing device configured to store a set of instructions that, when executed, cause the computing device to communicate to a user device a light field data and location information, the user device comprising a processor adapted to process the light field data; and process the light field data to represent a portion of a viewed scene by the user device based on the location information, wherein the portion of the viewed scene describes a location-based portion of a three-dimensional volume in a surrounding environment of the user device. In embodiments, the light field data may include a three-dimensional volume describing the light flowing in a plurality of directions through a plurality of light field data points. The user device may be configured to present augmented reality or mixed reality content where the portion of the viewed scene is presented against the surrounding environment viewed by the user device. The portion of the viewed scene may remain fixed with reference to the surrounding environment. The portion of the viewed scene may be oriented with respect to an object. The object may be a virtual object presented against the surrounding environment as viewed through the user device. The object may be a real object in the surrounding environment as viewed through the user device. The light field data may be generated with respect to a resolution constraint. The resolution constraint may be with respect to a number of light field vectors for each of a plurality of light field data points. The resolution constraint may be with respect to a density function of a plurality of light field data points. The density function may be with respect to a field of view of the portion of the viewed scene. The resolution constraint may be with respect to a direction function of light field vectors within the portion of the viewed scene. The light field data may be generated with resolution stitches with low resolution light fields and high resolution light fields representing the portion of the viewed scene. The user device may be communicatively coupled to a display for presentation of display data.

In an aspect, a method may include communicating, by a computing device, a first light field data to a user device; receiving, by the computing device, a sensor data associated with the user device; predicting a behavior based at least in part from the received sensor data; generating with the computing device a second light field data based at least in part on the predicted behavior; and communicating, by the computing device, the second light field data to the user device. In embodiments, the behavior may be a behavior of the user device. The behavior of the user device may be determined by the computing device to be representative of a user behavior. The light field data may include a three-dimensional volume describing the light flowing in a plurality of directions through a plurality of light field data points. The first light field data may include a first surface volume in a surrounding environment with respect to the user device, and the second light field data comprises a second surface volumes in a surrounding environment with respect to the user device. The predicted behavior may be a predicted future position. The sensor data may represent the predicted future position based on a velocity vector or acceleration vector determined from the sensor data. The second light field data may be associated with a different location within a surrounding environment with respect to the first light field data. The predicted behavior may be a predicted viewing angle. The predicted viewing angle may be based on a line of sight vector determined from the sensor data. The second light field data may be associated with a different location within a surrounding environment with respect to the first light field data. The predicted behavior may be based on a prior action. The prior action may be determined to have similar behavior characteristics to a present action. The predicted behavior may be based on an action of a second user device. The second user device may be determined to be in a surrounding environment through the sensor data. The first light field data may include a volume of space proximate to the user device and the volume of space associated with the second light field data may be determined by the predicted behavior. The first light field data may include a light field resolution and the light field resolution associated with the second light field data may be determined by the predicted behavior. The first light field data may include a directionality with respect to a user device perspective and the directionality associated with the second light field data may be determined by the predicted behavior. The directionality of the first light field data may be associated with a field of view with respect to a user device perspective and the field of view associated with the second light field data may be determined by the predicted behavior. The first light field data may include a light field point density and the light field point density associated with the second light field data may be determined by the predicted behavior. The first light field data may be associated with a first head position of the user device and the head position associated with the second light field data may be determined by the predicted behavior. The head position associated with the second light field may be at least in part determined by a probability gradient of possible head positions based on a previous head position. The predicted behavior may be determined at least in part through machine learning associated with previous user behavior. The behavior may be determined to be a user contact with an object, wherein the second light field data may be located to be concurrent with a location of the object. The object may be a physical object in a surrounding environment. The object may be a virtual object in surrounding virtual environment. The user device may be communicatively coupled to a display for presentation of display data. The sensor data may include position sensor data. The sensor data may include motion sensor data.

In an aspect, a system may include a computing device associated with an image processor, the computing device configured to store a set of instructions that, when executed, cause the computing device to communicate, by a computing device, a first light field data to a user device; receiving, by the computing device, a sensor data associated with the user device; predict a behavior based at least in part from the received sensor data; generate with the computing device a second light field data based at least in part on the predicted behavior; and communicate, by the computing device, the second light field data to the user device. In embodiments, the behavior may be a behavior of the user device. The behavior of the user device may be determined by the computing device to be representative of a user behavior. The light field data may include a three-dimensional volume describing the light flowing in a plurality of directions through a plurality of light field data points. The first light field data may include a first surface volume in a surrounding environment with respect to the user device, and the second light field data comprises a second surface volume in a surrounding environment with respect to the user device. The predicted behavior may be a predicted future position. The sensor data may represent the predicted future position based on a velocity vector or acceleration vector determined from the sensor data. The second light field data may be associated with a different location within a surrounding environment with respect to the first light field data. The predicted behavior may be a predicted viewing angle. The predicted viewing angle may be based on a line of sight vector determined from the sensor data. The second light field data may be associated with a different location within a surrounding environment with respect to the first light field data. The predicted behavior may be based on a prior action. The prior action may be determined to have similar behavior characteristics to a present action. The predicted behavior may be based on an action of a second user device. The second user device may be determined to be in a surrounding environment through the sensor data. The first light field data may include a volume of space proximate to the user device and the volume of space associated with the second light field data may be determined by the predicted behavior. The first light field data may include a light field resolution and the light field resolution associated with the second light field data may be determined by the predicted behavior. The first light field data may include a directionality with respect to a user device perspective and the directionality associated with the second light field data may be determined by the predicted behavior. The directionality of the first light field data may be associated with a field of view with respect to a user device perspective and the field of view associated with the second light field data may be determined by the predicted behavior. The first light field data may include a light field point density and the light field point density associated with the second light field data may be determined by the predicted behavior. The first light field data may be associated with a first head position of the user device and the head position associated with the second light field data may be determined by the predicted behavior. The head position associated with the second light field may be at least in part determined by a probability gradient of possible head positions based on a previous head position. The predicted behavior may be determined at least in part through machine learning associated with previous user behavior. The behavior may be determined to be a user contact with an object, wherein the second light field data may be located to be concurrent with a location of the object. The object may be a physical object in a surrounding environment. The object may be a virtual object in surrounding virtual environment. The user device may be communicatively coupled to a display for presentation of display data. The sensor data may include position sensor data. The sensor data may include motion sensor data.

In an aspect, a method may include receiving, by a computing device associated with an image processor, a sensor data associated with a user device; generating, by the computing device, light field data based on a predicted behavior determined at least in part by the received sensor data; and communicating, by the computing device, the light field data to the user device. In embodiments, the light field data may include a three-dimensional volume describing the light flowing in a plurality of directions through a plurality of light field data points. The predicted behavior may be a predicted future position of the user device. The sensor data may represent the predicted future position of the user device based on a velocity vector or acceleration vector determined from the sensor data. The predicted behavior may be a predicted viewing angle of the user device. The predicted viewing angle may be based on a line of sight vector determined from the sensor data. The predicted behavior may be based on a prior action. The prior action may be determined to have similar behavior characteristics to a present behavior. The predicted behavior may be further based on an action of a second user device. The second user device may be determined to be in a surrounding environment through the sensor data. The second user device may be associated with a virtual user. The light field data may include a volume of space proximate to the user device and the volume of space may be determined by the predicted behavior. The light field data may include a light field resolution and the light field resolution may be determined by the predicted behavior. The light field data may include a directionality with respect to a user device perspective and the directionality may be determined by the predicted behavior. The light field data may include a light field point density and the light field point density may be determined by the predicted behavior. The user device may be a head-worn device, and the predicted behavior may be associated with a head position of the user device. The predicted behavior may be determined at least in part through machine learning associated with previous behavior. The predicted behavior may be determined to be associated with a user contact with an object. The object may be a physical object in a surrounding environment. The object may be a virtual object in surrounding virtual environment. The user device may be communicatively coupled to a display for presentation of the display data. The sensor data may include position sensor data or motion sensor data.

In an aspect, a system may include a computing device associated with an image processor, the computing device configured to store a set of instructions that, when executed, cause the computing device to: receive a sensor data associated with a user device; generate, by the computing device, light field data based on a predicted behavior determined at least in part by the received sensor data; and communicate, by the computing device, the light field data to the user device. In embodiments, the predicted behavior may be a behavior of the user device. The predicted behavior may be a predicted future position. The predicted behavior may be a predicted viewing angle. The predicted behavior may be based on a prior action. The light field data may include a three-dimensional volume describing the light flowing in a plurality of directions through a plurality of light field data points. The predicted behavior may be a predicted future position of the user device. The sensor data may represent the predicted future position of the user device based on a velocity vector or acceleration vector determined from the sensor data. The predicted behavior may be a predicted viewing angle of the user device. The predicted viewing angle may be based on a line of sight vector determined from the sensor data. The predicted behavior may be based on a prior action. The prior action may be determined to have similar behavior characteristics to a present behavior. The predicted behavior may be further based on an action of a second user device. The second user device may be determined to be in a surrounding environment through the sensor data. The second user device may be associated with a virtual user. The light field data may include a volume of space proximate to the user device and the volume of space may be determined by the predicted behavior. The light field data may include a light field resolution and the light field resolution may be determined by the predicted behavior. The light field data may include a directionality with respect to a user device perspective and the directionality may be determined by the predicted behavior. The light field data may include a light field point density and the light field point density may be determined by the predicted behavior. The user device may be a head-worn device, and the predicted behavior may be associated with a head position of the user device. The predicted behavior may be determined at least in part through machine learning associated with previous behavior. The predicted behavior may be determined to be associated with a user contact with an object. The object may be a physical object in a surrounding environment. The object may be a virtual object in surrounding virtual environment. The user device may be communicatively coupled to a display for presentation of the display data. The sensor data may include position sensor data or motion sensor data.

BRIEF DESCRIPTION OF THE FIGURES

FIG. 2 depicts an embodiment for a home page of an administrator.

FIGS. 6A-6B depict a side and top view of ray tracing with respect to light field data.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
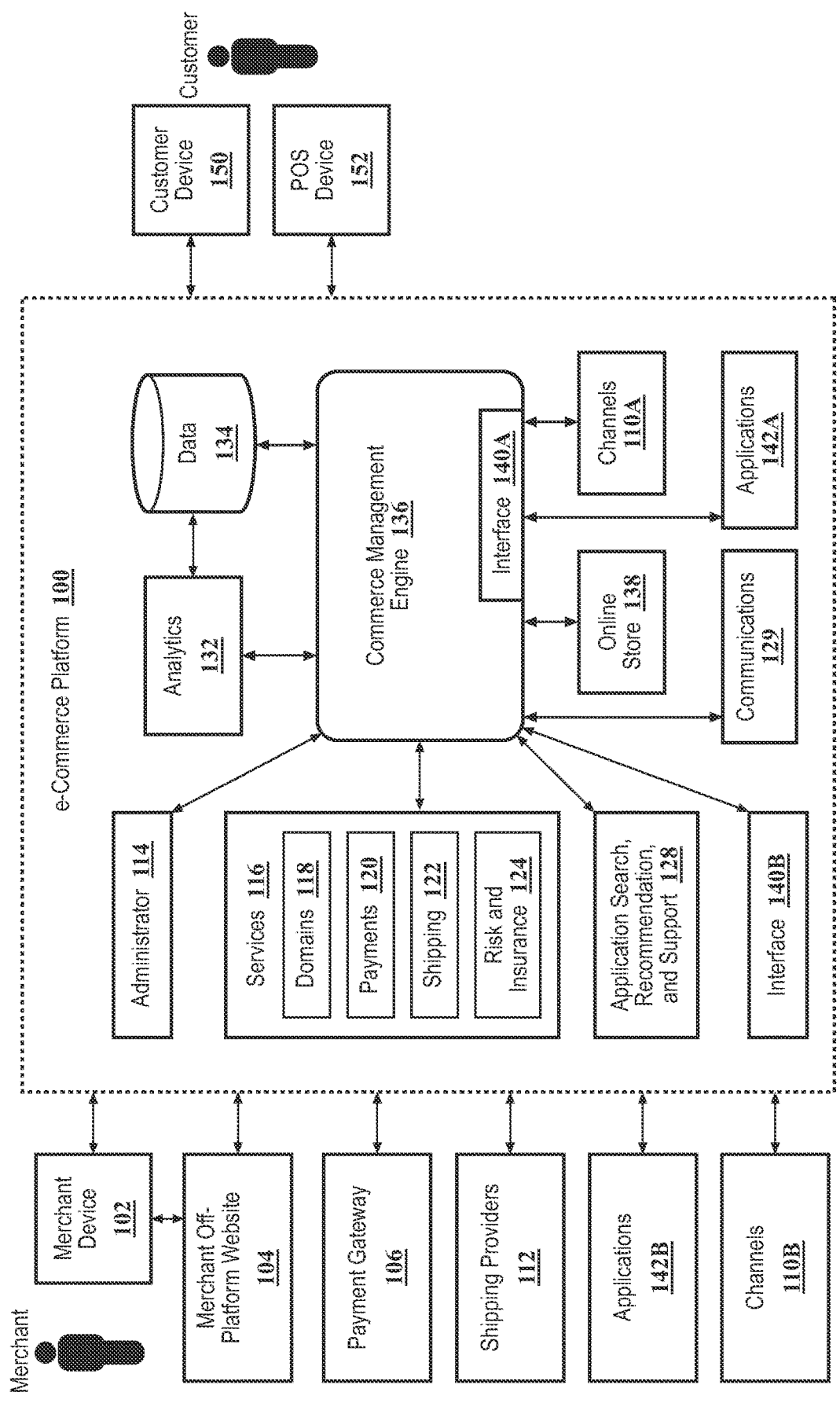
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
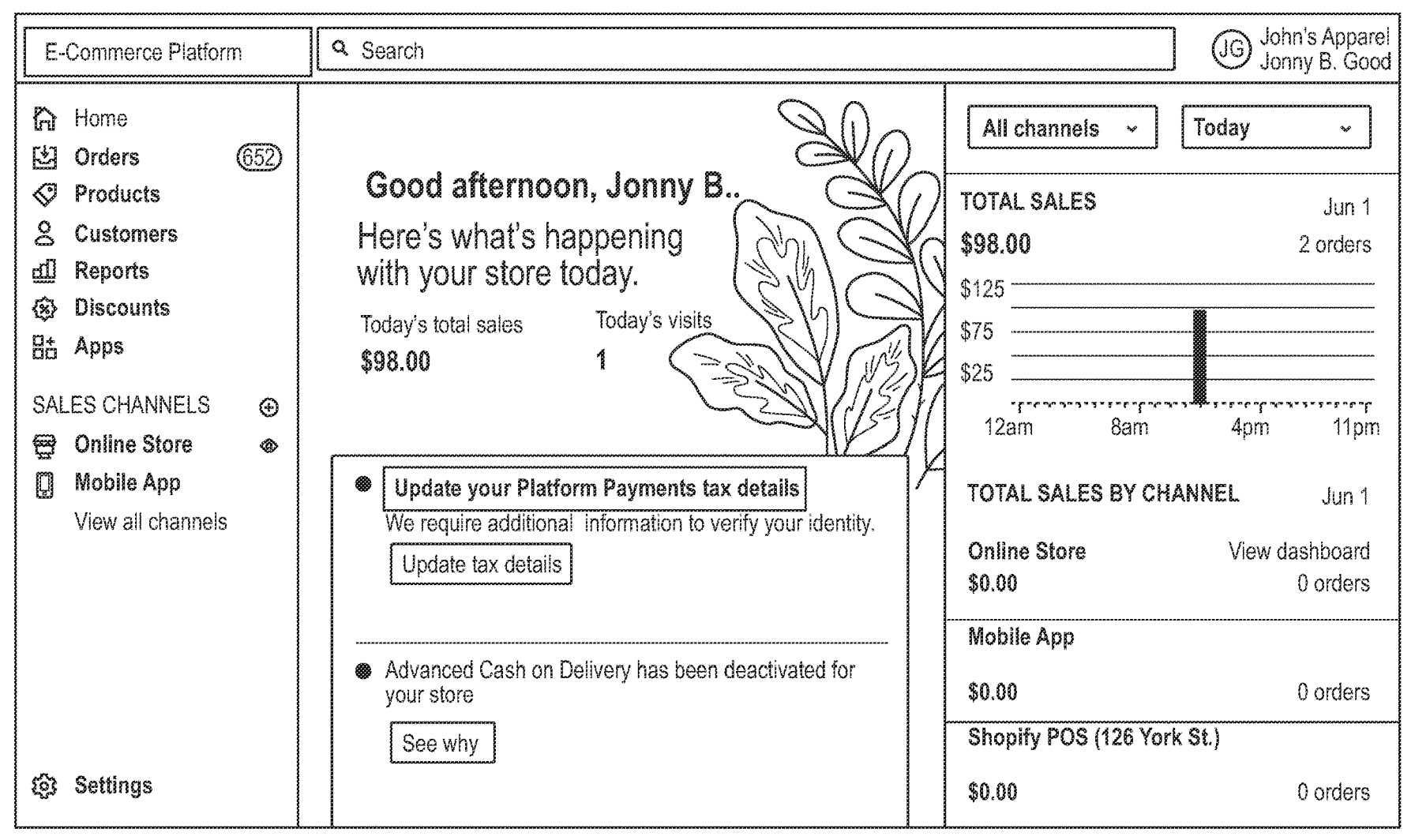

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

In embodiments, the e-commerce platform 100 may interface with a user device in support of interactive visual content being delivered to a user device, such as where the user device is a virtual reality (VR) device, augmented reality (AR) device, mixed reality (MR) device (e.g., head-worn, body-worn, or hand-held), or any device that can interpret/process visual content (e.g., a smart phone or mobile computing device), where the e-commerce platform 100 provides image processing functions to generate the visual content to be delivered to the user device in response to a change in visualization context. In embodiments, the e-commerce platform 100 may be any platform or computing device remote to a user device. In embodiments, a user device may also have the ability to process video data and to detect user position and direction of view (e.g., through sensors such as position sensors, motion sensors, cameras, and the like). In embodiments, a user device may be a combination of smart phone, sensor array, and VR, AR, or MR devices, such as where a smart phone interfaces with a VR, AR, or MR device, or acts as a VR, AR, or MR device in conjunction with worn sensors or devices (e.g., a smart phone interfacing (e.g., via Bluetooth) with a head-worn sensor to detect position and/or motion of a user's head), and the like.

Although image processing functions associated with the processing of visual content may be provided by an image processor in association with the e-commerce platform 100, one skilled in the art will appreciate that any communicatively coupled hardware or software image processing computing facility may provide this function, such as provided through a cloud platform, a network, a server, a computing device, an application providing image processing capabilities, and the like, such as over the Internet using a WiFi or other wireless or wired connection, and the like. For instance, image processing may be provided by the e-commerce platform 100, remote from the e-commerce platform 100, or in any combined or networked configuration known in the art.

Figure 3:
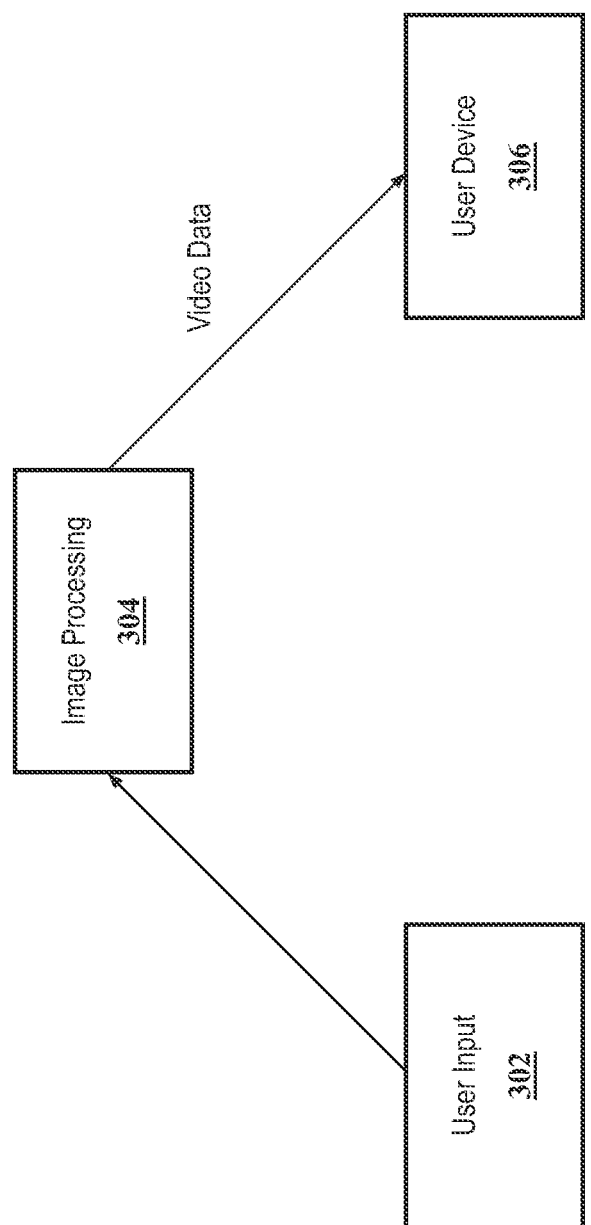
FIG. 3 depicts a prior art visual-based interactive system.

With reference to FIG. 3, image processing 304 may be performed remotely from a user device 306, and as such may result in a delay between the remote generation of video data and the displaying of the video data on the user device 306 (e.g., due to image processing time, transmission time, and the like). Updating and/or sending video data may be generally associated with a scene change in the user experience delivered to the user device 306, such as due to a virtual environmental change (e.g., the leaves moving on a nearby tree due to the wind and the need to send video data to the user device to update the scene for the moving leaves), another virtual user or object entering the scene (e.g., a second user in the user's field of view), an environmental change due to an action taken by the user through the user device (e.g., the leaves on the tree moving due to the user activating a virtual fan from the user device), a user device input received that senses a movement of the user device 306 (e.g., a head-mounted sensor that senses the user is translating (e.g., the user moving forward causing the scene to change) or rotating (e.g., the user turning their head causing the field of view of the scene to change), and the like. Although embodiments herein generally describe user inputs 302 as an interactive cause for the need to transmit new video data to the user device 306, one skilled in the art will appreciate that non-interactive causes (e.g., scene changes that are not the direct result of a user action, such as dynamic movements of the environment (e.g., the blowing of leaves on a tree)) may also result in video data updates and/or transmission.

In embodiments a user input 302 (e.g., sensor data associated with the user device) may be received by the e-commerce platform 100 for image processing 304 (or other image processing) where visual content is generated and communicated to the user device 306. For instance, a user may be using a VR user device where the user responds to visual content (or, in embodiments throughout, audio content where visual representation has a corresponding auditory signal that may be processed independently or concurrently) being displayed and where the user response is detected by a sensor (e.g., on the user device) and communicated back to the e-commerce platform 100 for image processing. The e-commerce platform 100 then generates a new visual content in response to the resulting scene change. In an example, the user may see a virtual door to the left as displayed by the VR device in a virtual environment where the user makes a motion due to the scene change. The VR user device senses this movement (e.g., head motion or body motion) and sends related sensor data back to the e-commerce platform 100. Image processing resources of the e-commerce platform 100 compute information regarding the scene and video data is transmitted (e.g., over the internet using a WiFi connection) to the VR device. The video data is then further processed on the VR device to create a display for the user.

In embodiments, the processing of the image content may be divided between a remote image processing computing device (e.g., on a cloud platform) and processing locally to the user device (e.g., on the user device itself). In embodiments, in order to minimize the resources required on the user device, much of the image processing functionality may be provided on the remote image processing computing device, with the user device containing whatever processing is required to convert the transmitted image content into display data. However, the time for this process, even with minimal processing on the user device, may result in latency (e.g., from the time of the user input until the time the resulting visual content is provided to the user device), such as for a VR, AR, or MR user experience.

As a result, interactive visual content systems have explored the reduction of latency using services in wireless technologies such as enhanced mobile broadband (eMBB), ultra-reliable and low latency communication (URLLC), and the like, as well as the use of highly specialized network protocols to deliver visual content at a reduced latency (e.g., <15 ms round trip). Techniques for combating virtual reality sickness include high-quality tracking systems to synchronize virtual environment movements and the effect on the vestibular system. Another method to combat virtual reality sickness leverages the manipulation of field of view (FOV), either by reduction or changing the FOV in the user device display to change the perceived motion. Three-dimensional interactive elements may follow cloud rendering principles to leverage the large processing resources available by moving more processing to the cloud as opposed to on the local user device. There may be non-zero latency in cloud rendering systems. Interactive headsets may handoff rendering processing to the cloud to only display a video stream of the fully rendered scene. Video stream approaches may leverage the efficiencies of H.264, H.265, AV1, and other codecs to improve performance metrics. In addition, advances in video streaming technologies may help to reduce transmission latency.

However, processed video streams are susceptible to network jitters and interruptions (and general latency) which can lead to jitters and freezes in the video stream leading to a degraded user experience (e.g., conscious awareness of the delays and jitter). Additionally, any delay in rendering scene changes may result in virtual reality sickness (e.g., often due to even unconscious delays, where there may be a subset of the population that may notice latency no matter how small).

Figure 4:
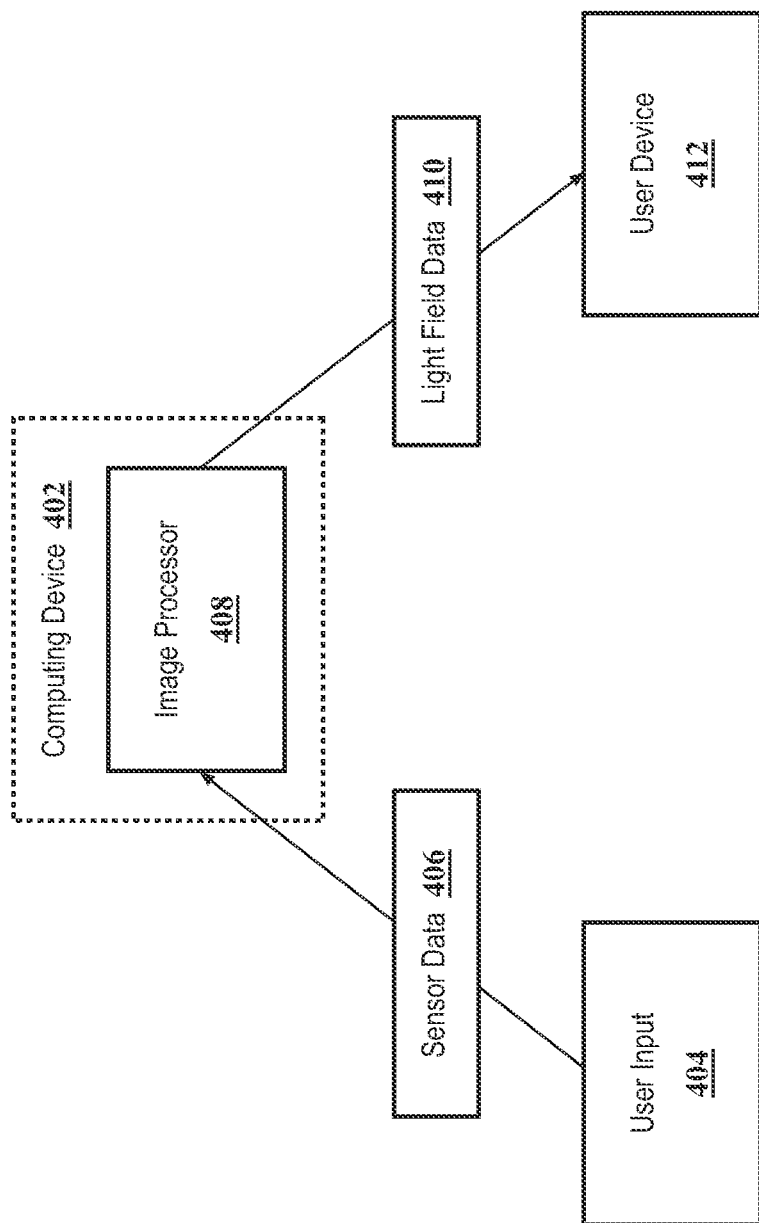
FIG. 4 depicts an embodiment visual-based interactive system.

Referring to FIG. 4, to help solve the consequences of latency associated with transmitting video stream data, a computing device 402, such as including or in association with an image processor 408, may transmit light field data 410 to the user device 412, such as in response to a scene change (e.g., change in the environment or due to a user input 404 such as sensor data 406). For instance, the light field data 410 may include a visual content that is greater than a display field of view of a user device with respect to position (e.g., the display views a field of view for a current position but the light field data includes data for viewing from a position ahead, behind, or to the side of the current position), viewing angle (e.g., the display views a 45-degree field of view but the light field data includes data for viewing out to 90 degrees, 180 degrees, or a full 360 degrees), and the like, such as where the light field data 410 is for a greater field of view at the time of the communication of the light field data, at a time of the expected time of receipt of the light field data, and the like. For example, the light field data 410 may include data for displaying a field of view for a user in a current position and viewing angle but also for a future or predicted position, if the user moves ahead, turns around, and the like. In embodiments, the light field data 410 may include data for displaying a current field of view as well as a future field of view that is predicted with a certain probability (e.g., based on current or past behavior it is likely the user will move forward and turn to the left). The light field data may include data for what a user can see at a current position, but also for what the user may see if the user takes a step forward (since what the user sees in the step forward may be outside the user's field of view from when the user is a step back). As such, the user device will have light field data from the surrounding environment to accommodate scene changes (e.g., translations and rotations from a current position and viewing angle) without the need to send additional data to the user device.

Although the present description may generally utilize an image processor 408 in the processing of light field data 410, in practical applications communications between the image processor 408 and the user device 412 may be mediated by or through a computing device 402, such as where the computing device 402 is managing communications, processing data associated with a visual-based interactive system using light field data 410 (e.g., utilizing an image processor 408, such as with or in association with the e-commerce platform 100), and/or a computing device local to the user device (e.g., a local console, a smart phone, and the like, communicating with the user device), for providing processing functions. As such, for simplicity the present description generally depicts image processing and the communications with the user device 412 to be through the computing device 402. However, this is not meant to be limiting in any way, where one skilled in the art will appreciate that image processing and/or communications with the user device 412 may be provided by the computing device 402 remote from the user device or local to the user device, a local computing device, the image processor 408 (e.g., provided in the cloud, the e-commerce platform, the local computing device), or in combination, where the computing device 402 may comprise the image processor 408, communicate with the image processor 408, and the like, in any computing configuration known in the art.

A light field may describe the amount of light flowing in every direction through every point in space. In embodiments, the light field data 410 may be limited to a determined or configured volume of space or amount of light for a given volume such as the amount of light flowing through a given point in space may be limited to a number of rays of light passing through the point, and/or the number of points per unit of space may be limited by a point density. However, by providing light field data 410 to a user device 412 the user device would have all the visual information required for the user device to visualize the space as it is moved around within the volume of space without the need to transmit more visual content to the user device. That is, as long as the user (operating the user device) stays within the set volume there may be no need to transmit more data to the user device 412 in a relatively non-changing visual scene. Thus, although the time to perform the image processing steps at the computing device 402 and the time to transmit between the computing device 402 and the user device 412 may not have changed, the perceived scene lag by a user may be reduced or eliminated by controlling the volume of light field data 410 provided to the user device 412. If storage and processing on the user device 412 was unlimited, the computing device 402 may only need to send one large light field to the user device 412 per scene. Practically, the computing device 402 may provide a volume or series of volumes to the user device 412 based on some criteria with respect to the current and/or predicted future user device position and movement, such as with respect to a viewing perspective of the user device 412, a velocity and/or acceleration vector of the user device 412, a behavior of the user device 412 (e.g., associated with the behavior of the user operating the user device), nearby other user devices, and the like. Thus, using light field data 410 enables faster overall processing through light field rendering, such as based on sensors (e.g., accelerometers and the like) tuned to relatively small or micro movements of the user device 412 (e.g., head movements of a VR or AR device) and may help reduce perceived latency. Transmitting light field data 410 may also reduce the instances of virtual reality sickness by enabling a continuous virtual environment provided through the locally stored light field without the jarring environmental effects of network jitters or interruptions associated with transmission of traditional visual data (e.g., video stream data) for every user device movement.

In embodiments, light field data 410 (or series of light field data) in a stream of light fields may be described by any shaped light field surface volume, such as cubes or cylinders of light field data 410, or partial surface forms, where the light field data 410 points reside on light field surface volume. That is, the 'points' of the light field are on this surface volume, but do not fill the surface volume. Thus, the light field surface volume represents a potential display area for the user device 412 for multiple views from within the light field surface volume (e.g., a user could turn their head around viewing in three dimensions from a full surface volume surrounding the user device, move within the surface volume, and the like). For example, the computing device 402 may send the user device 412 light field data 410 comprising a light field volume surrounding the user device 412 in all directions out to one meter. Alternatively, the computing device 402 may selectively send light field data 410 for a portion of a full light field volume surrounding the user device 412, such as for a volume surface or hemisphere of space surrounding the user device 412 centered on the current direction of view presented by the user device 412 (e.g., the user device is a VR headset and the light field data 410 is for a hemisphere centered on the field of view of the VR headset).

Figure 5:
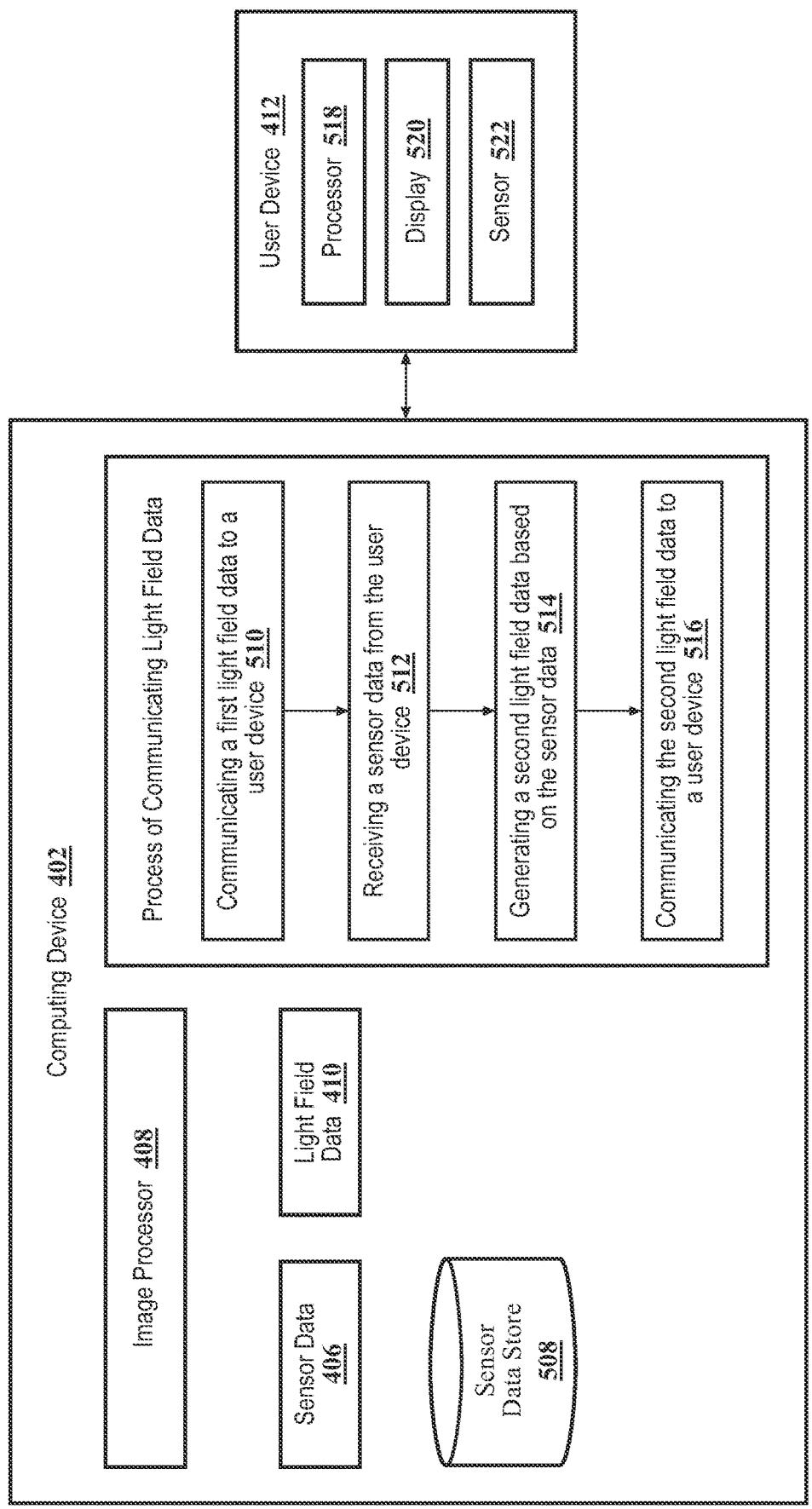
FIG. 5 depicts an embodiment visual-based interactive system using light field data.

Referring to FIG. 5, a computing device 402 may utilize an image processor 408 to process light field data 410 for communication to a user device 412. Although FIG. 5 depicts the image processor within the computing device 402, as described herein the image processor 408 may be included as part of the computing device 402, provided external to the computing device 402, or in combination. In an embodiment process flow example, in a first step 510, which may be optional in embodiments, the computing device 402 may communicate a first light field data to the user device 412. For instance, the first light field data may contain views for a first location of the user device 412 (e.g., where a user of the user device is standing, either in real or virtual space) concentrated in a first view (e.g., a display perspective of the user device representative of a direction a user of the user device is looking). In a second step 512 the computing device 402 may receive sensor data 406 associated with the user device 412. For instance, the sensor data 406 may be position or motion sensor data (e.g., from an accelerometer mounted in such a way as to measure movements of the user device 412 or worn on the user to measure the movements of the user (e.g., head of the user)). In embodiments, sensor data 406 may be stored in a sensor data store 508, such as for future processing (e.g., predicting a future sensor data from past sensor data). In a third step 514 the computing device 402 may generate a second light field data based at least in part on the received sensor data 406. For instance, the sensor data 406 may have been processed and determined to represent a change in viewing angle (e.g., the head of the user has turned) or position of the user device 412 (e.g., the user device has moved forward). As a result, the computing device 402 may have generated the second light field data to include a light field volume for a different view angle, a different position in space, and the like, based on the sensor data 406. In a fourth step 516, the computing device 402 may communicate the second light field data to the user device 412. In embodiments, the user device 412 may include a processor for processing the light field data 410, converting light field data 410 into display data for presentation on a display 520, collect sensor data 406 associated with a sensor 522, and the like.

In embodiments, the light field data 410 may be restricted to a subset or portion of a light field, such as in an AR or MR application, where the light field data 410 is restricted to a scene of interest (e.g., a portion of a full light field volume). In embodiments the determining of the subset or portion of the light field may be a pre-processing step (e.g., at the generation of the light field data), done at time of transmission to determine what portion of light field data to transmit, and the like, where the determination may also include determining an order, resolution, and the like. For example, for an AR or MR use case, the computing device 402 may selectively create a subset of a light field for a scene for the user rather than the entire environment. As such, the amount of light field data 410 needed is reduced to only the light field data relevant to the subset of the scene, where the amount of light field data 410 generated is reduced, the amount of light field data 410 transmitted is reduced, and the like. For example, in an AR application the real scene may be provided in the background and the light field data 410 is generated to augment an area of interest, such as a virtual product placement in an area in the real scene (e.g., a user's home).

In embodiments, light field data 410 may comprise multiple volumes or volume surfaces of light field data, such as one for a surrounding scene or environment and one for an object or area of interest. In embodiments, the multiple volumes or surfaces may have different resolutions, different sizes, different placements relative to the user device, and the like. For instance, a first light field volume may be of a scene surrounding the user device (e.g., a retail store scene) and have a relatively lower resolution to that of a second light field volume for an object of interest (e.g., a higher resolution product being viewed by a user of the user device). In embodiments, a second volume may be located within a first volume. For instance, a first volume may have a volume that surrounds the user device such that the user of the user device is viewing outward into the first volume, such as where the first volume is a surrounding environment, and a second volume is placed inside the first volume where the user device is inside the first volume but outside the second volume. In this way, a user of the user device would be viewing outward into the first volume but inward into the second volume. In an example, a user and user device may be placed inside the first volume representing a virtual retail store where the second volume representing a product is placed inside the first volume and next to the user and user device. The user of the user device may then look around (i.e. the user device is displaying) and view outward into the surrounding virtual retail store as well as viewing into the second volume to view the product. In this instance, the product, being the object of focus for the user, may be rendered at a higher resolution than the retail store. In embodiments, resolution may be dependent on a viewing direction for the user device, such as providing higher resolution based on the direction the user device is pointing, has pointed to in the past, is predicted to point in the near future, and the like (for example, the light field may have different resolutions in different directions and different point densities in different areas). In embodiments, resolution may be based on whether the user device is stationary, translating in motion, rotating in motion, moving quickly or slowly, and the like.

Referring to FIGS. 6A-6B and 7A-7B, only the rays of light that are associated with the area of interest (here the area around the trees) are used to generate light field data 410. So, the light field data 410 may only include light field data relevant to the area of interest. Rays of light may also be restricted to include a limited area of interest but including a present location or view angle (e.g., where the user is currently standing and looking) and potentially rays traced from the area around the location of the user device 412 proximal to a current location (e.g., where the user is likely to look in the future). The transmitted light field volume (or surface volume) may be generated by each potential set of ray tracings for each proximal position of the user device view. The size of the light field volume may determine the amount of translation and/or rotation that is allowable by the user device 412 without the need for additional light field data 410. In embodiments, the light field volume may be deterministic based on the size of the available viewable virtual object or environment to the user device 412 as well as other considerations, such an order of transmission for subsequent volumes, resolution of the light field, and the like.

Figure 7A:
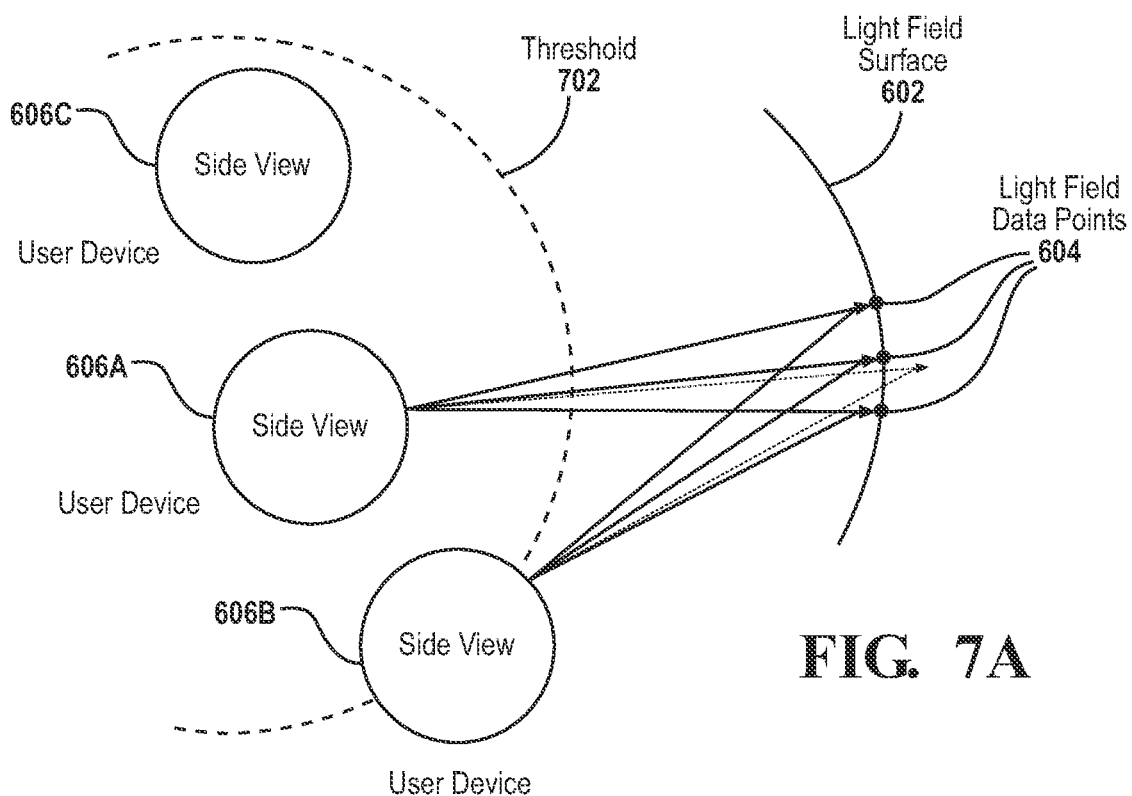
FIGS. 7A-7B depict a side and top view of ray tracking with respect to light field data.
Figure 7B:
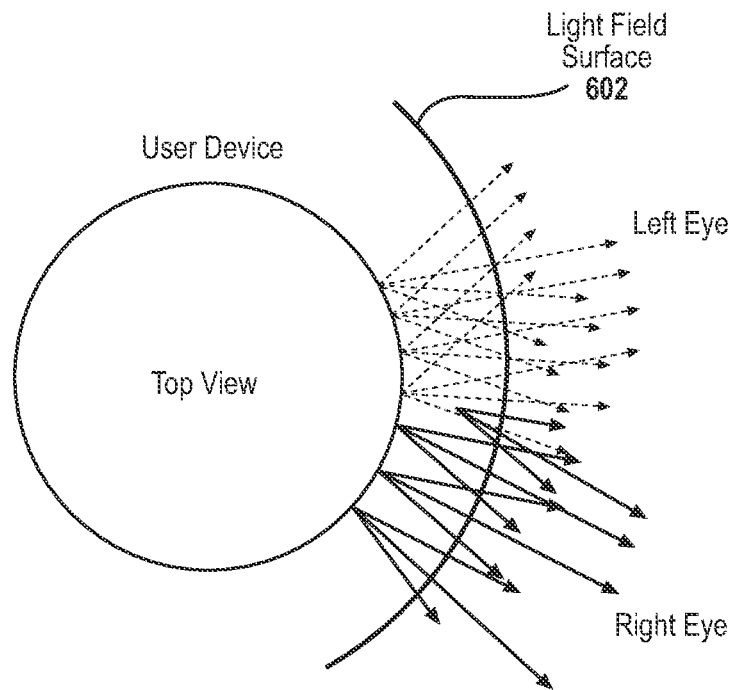

Referring to FIGS. 6A-6B, the user device 606 may be placed inside the light field volume, where the light field volume has a light field surface 602 on which a plurality of light field points 604 are located. Referring to FIGS. 7A-7B, it may be seen that each light field data point 604 provides a plurality of viewing angles for the user device to view the surrounding environment, such as one view if the user device is at position 606A and a second view if the user device is at position 606B. In this way the user device may maintain a view of the surrounding environment while moving around within the light field volume (e.g., as defined by the extent of the light field surface 602). If the user device were to move outside the light field volume (e.g., beyond the light field surface 602) the user device may cease viewing at least a portion of the surrounding scene. As such, it may be desirable to monitor the movements of the user device with respect to the proximity of the user device 606 to the light field surface 602, such as with respect to a threshold 702, which may then provide a buffer zone for determining whether new light field data should be transmitted or requested. For instance, a threshold 702 may be set with respect to the light field surface 602 such that if the user device stays within the threshold (e.g., doesn't cross the threshold) there may be no need to send a new light field data to the user device. That is, as long as the user device is staying well within the light field volume the current light field data provided to (for example, stored in) the user device may provide views of the surrounding environment without any additional light field data being transmitted by the computing device. However, if the user device 606 crosses the threshold 702 then the computing device may transmit additional light field data. In an example, if the user device moves from location 606A to location 606C (e.g., staying within the threshold) there may be no need to transmit additional light field data to the user device. However, if the user device moves from location 606A to location 606B (e.g., crossing the threshold) the computing device may transmit new light field data and/or the user device may request new light field data. In embodiments, the need to transmit additional light field data may be determined based on a behavior of the user device with respect to the threshold (e.g., position, velocity, acceleration with respect to the threshold). In embodiments, the threshold may be determined by the computing device, the user device, or in combination between the computing device and the user device. In a non-limiting example, the computing device may transmit a threshold along with the light field data, where the computing device monitors the location of the user device relative to the threshold through monitoring a sensor data sent from the user device to the computing device (e.g., a sensor providing location information, velocity information, acceleration information, and the like). In another non-limiting example, the user device may monitor its location with respect to the threshold and request new light field data from the computing device based on the movement characteristics of the user device (e.g., velocity, acceleration, and the like). In other embodiments, new light field data may be sent and/or requested based on a prediction that the user device will cross a threshold. In other embodiments, the location and size of a threshold may be changed based on the behavior of the user device (for example, the velocity and acceleration of the user device) and/or the characteristics and status of the connection between the user device and the computing device (for example, the threshold may be placed closer to the device when the device is traveling quickly or the connection is poor, to allow more of a buffer for providing new light field data).

In embodiments, processing of a portion of the light field data 410 may be provided by the computing device 402, by the user device 412, or in combination. For instance, the computing device 402 may generate the light field data 410 and then transmit only a portion of the light field data 410 generated, or the computing device 402 may generate and transmit the light field data 410 and provide the user device 412 with location information, and then the user device 412, at least in part, processes only a portion of the light field data received based on the location information (e.g., location information identifies a location in the surrounding environment) and then the user device 412 only needs to process changing views for display based on the location information.

Figure 8:
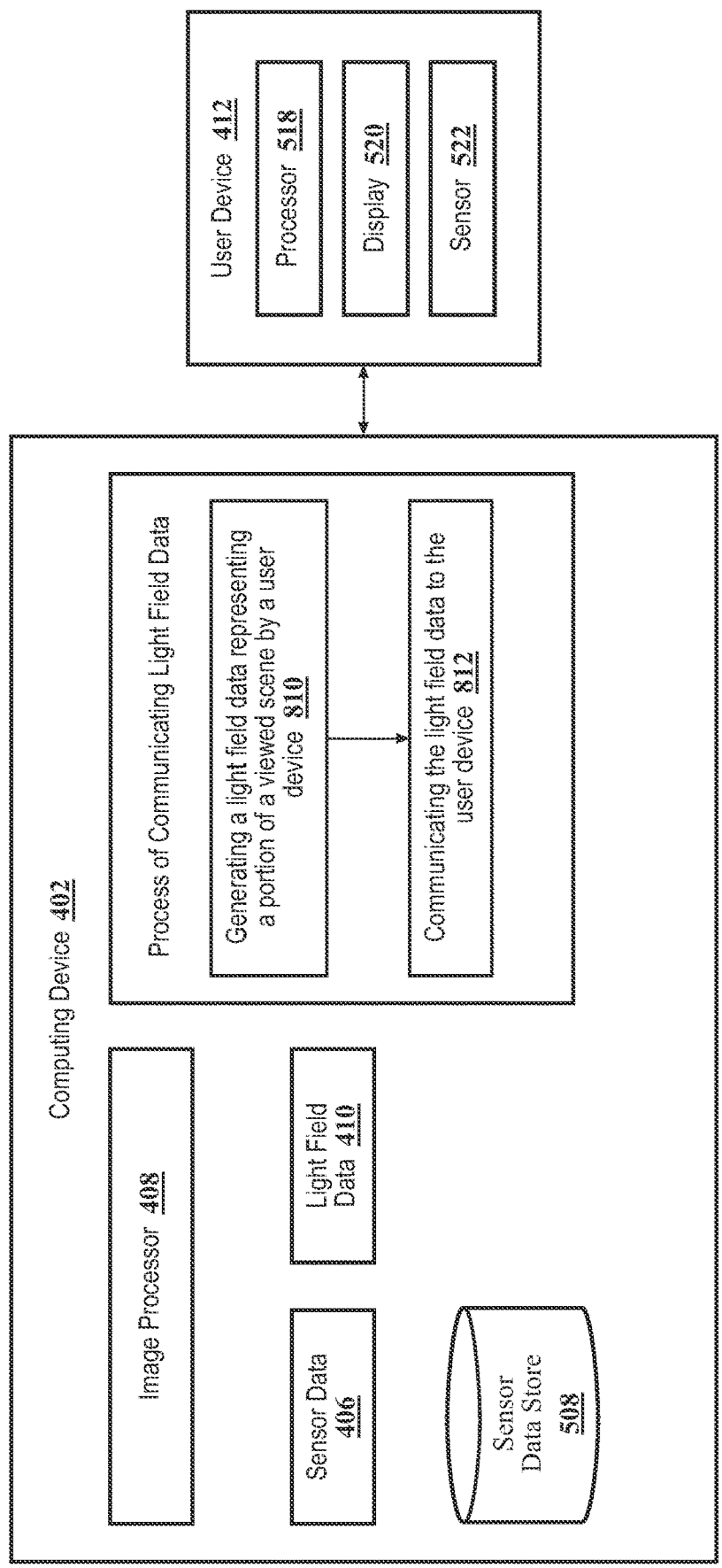
FIG. 8 depicts an embodiment visual-based interactive system using light field data in a partial view of surroundings.

Referring to FIG. 8, the computing device 402 may provide the processing for generating the portion of the light field data, such as in a first step 810 where the computing device 402 generates the light field data 410 representing a portion of a viewed scene by a user device 412, and in a second step 812 the computing device 402 communicates the light field data 410 to the user device 412. For instance, previous light field data may have indicated that a user of the user device is most likely to move in a certain direction while maintain a view in that direction. In this instance the computing device 402 may only communicate light field data comprising a light field volume for space in that direction (e.g., with a certain FOV to allow for the user looking back and forth somewhat). In embodiments, by limiting the spatial extent of the light field data sent to the user device the computing device 402 may be able to increase the volume for the light field data (e.g., where the volume is extended from 3 meters to 4 meters), refresh the light field data more often (e.g., increasing the rate of transmissions of light field data), decrease the processing required by the user device, and the like, such as to provide a more responsive process to a user action (e.g., when the user begins running providing more light field data in the direction of motion), decreased latency (e.g., higher refresh rate to the display), and the like.

Figure 9:
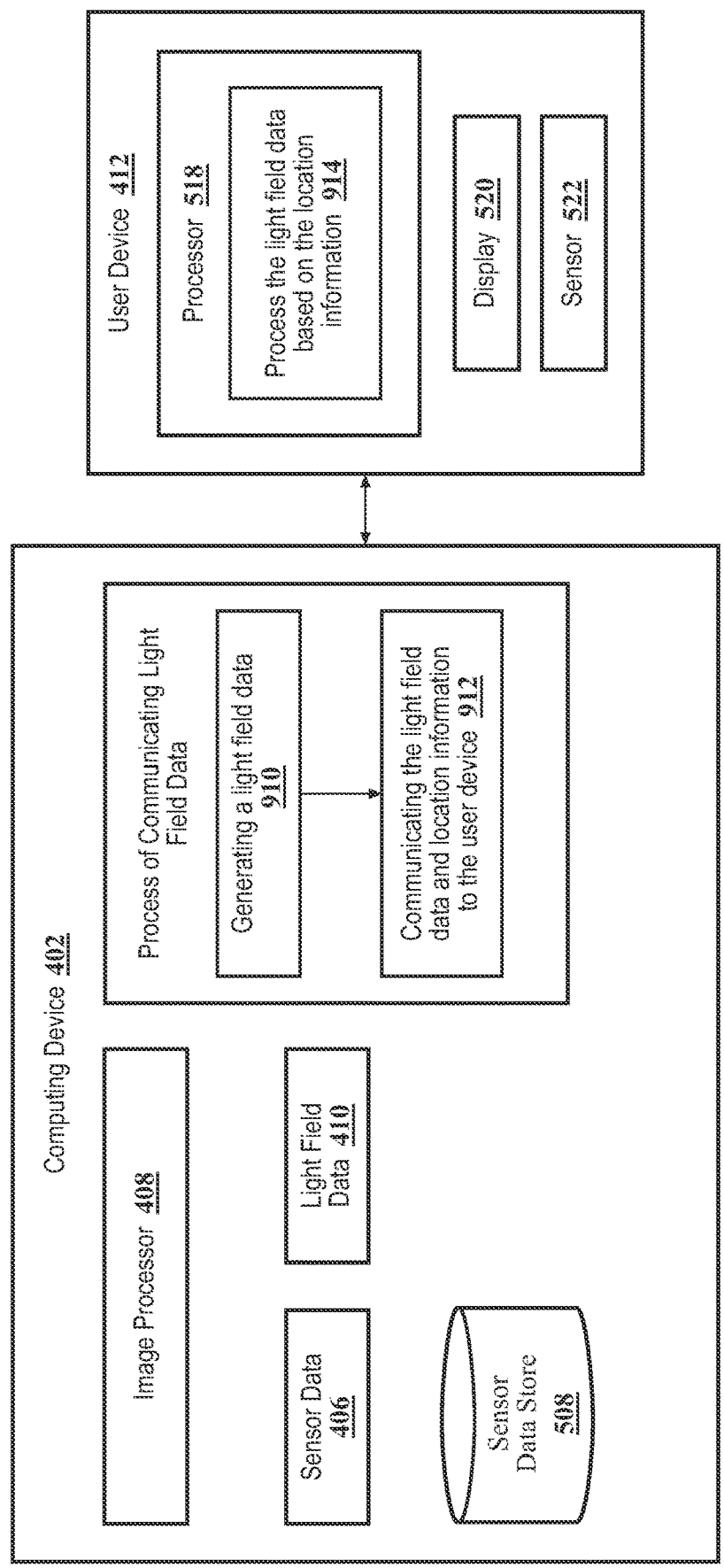
FIG. 9 depicts an embodiment visual-based interactive system using light field data in a partial view of surroundings where some partial view processing is performed on the user device.

Referring to FIG. 9, the user device 412 may provide the processing for a portion of the light field data 410, such as in a first step 910 where the computing device 402 generates the light field data 410, in a second step 912 the computing device 402 communicates the light field data 410 and location information, and in a third step 914 the user device 412 processes the light field data 410 based on the location information (e.g., where the light field data 410 is made to represent a portion of the viewed scene based on the location information). In this instance, rather than the computing device 412 determining and sending a limited portion of light field data, the computing device 402 may send a full or larger portion of a light field volume (e.g., a full hemisphere of data rather than say a partial hemisphere) along with location information that represents a viewing direction that has a higher probability for use or a position or subset of interest of the scene. For example, a user may be interacting with an object in a certain location and viewing angle and so the computing device 402 communicates a hemisphere of light field data relating to the position of the object. In addition, the computing device 402 communicates location information indicating the position of the object, and with this information the user device may be able to reduce the processing required to render display data. For instance, normally the user device may generate display data based on all of the light field data that the computing device 402 communicates, but now the user device may be able to reduce processing based on the location information.

Figure 10:
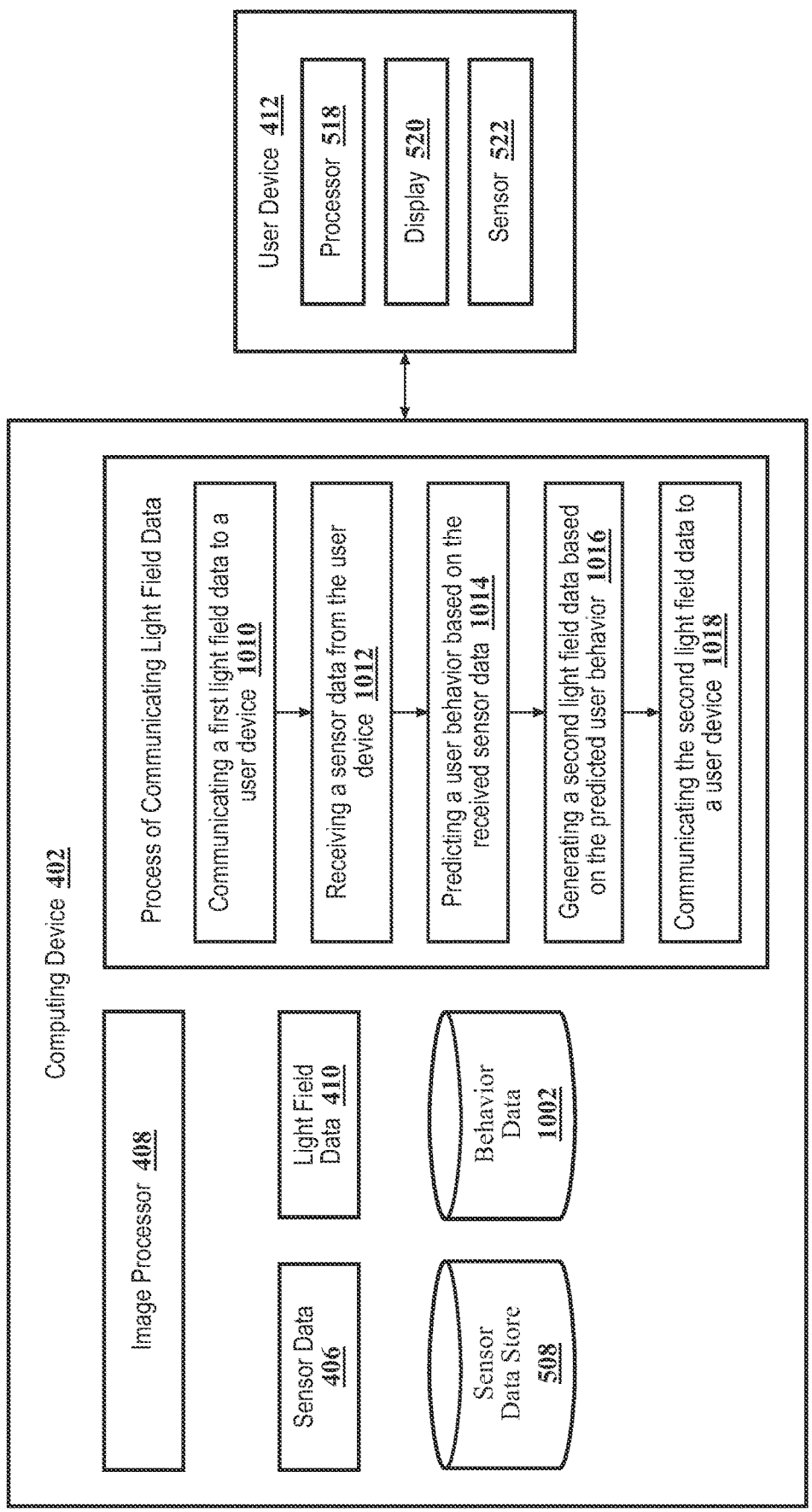
FIG. 10 depicts an embodiment visual-based interactive system using light field data and predicted behavior.

In embodiments, the computing device 402 may utilize a prediction of a user device location or behavior in the generation or selection of a next light field data 410 to be communicated to the user device 412. It may be possible to predict the future position (e.g., including orientation of view, where needed) for a user device 412 in a virtual or actual space or where a user of the user device 412 may look in relation to a virtual object, as well as future behavior of a user, such as how they may interact with a virtual object or a virtual space. In embodiments, a behavior may be a change in location (e.g., moving forward), a change in viewing perspective (e.g., a shift in viewing angle), a micro-movement (e.g., shaking or shifting), and the like, such as where the behavior is detected through a sensor or combination of sensors mounted in the user device or from sensors communicatively coupled to the user device (e.g., a wearable sensor in communication with the user device). The predictions may be based on velocity and/or acceleration vectors of the user, another user, or object, or further based on prior actions of the user (e.g., what the user did in the past in the space or with the object or in similar spaces or with similar objects), or further based on other users (e.g., in a virtual game application, when a given character or object enters a space, most users move away from the character or object). A prediction may then be used to determine the content of a next light field data 410 to communicate to the user device 412. Referring to FIG. 10, the computing device 402 may utilize prediction information in the generation of light fields, such as in a first step 1010 where the computing device 402 communicates a first light field data to the user device 412, in a second step 1012 where the computing device 402 receives sensor data 406 associated with the user device 412 (or retrieving behavior data 1002 as stored, such as from a previous interaction), in a third step 1014 where the computing device 402 predicts a behavior (e.g., a behavior of the user device 412 and/or representative of a user behavior) based on the received sensor data 406. Alternatively, the computing device 402 may predict a behavior based on other factors, such as other entities or objects in the surrounding environment. For instance, the predicted behavior may be based on an object entering the scene. In a fourth step 1016 the computing device 402 generates a second light field data based on the predicted behavior. Alternately, the second light field may not be generated but rather selected based on the predicted behavior. For instance, light field data may already have been generated and the prediction determines which light field data to communicate to the user device 412. In a fifth step 1018 the computing device 402 communicates the second light field to the user device 412.

In embodiments, a prediction may assist with determining what light field data 410 to send to the user device 412 next, to determine the size of light field volumes to send or the order of a series of volumes (e.g., based on the likely order of positions of the user, such as sending a bigger volume or box if the user's head is moving fast and a smaller box when they are perceived as being stationary or standing relatively still).

In embodiments, a prediction may assist with determining the resolution (or quality) of the light field data 410. For example, the computing device 402 may provide higher resolution light field data 410 for an area around objects a user is likely to examine but provide lower resolution data (or possibly no data or zero resolution) for areas around objects a user is less likely to view. Prediction may impact the creation of the light field data 410 (e.g., do not create or create only lower resolution light field data for areas users are unlikely to view or will only view when moving quickly so only lower resolution is needed) or may impact transmission (e.g., the light field data already exists at a higher resolution than needed, so reduce the resolution and then transmit).

In embodiments, a prediction may enable a volume optimization, such as by not generating a full volume like a cylinder, a sphere, or a cube, but instead generating a volume that is more directional such as in a half of a cube or sphere relative to the direction a user is or is predicted to be facing or moving or where the volume contains more data in certain regions or with respect to views in certain directions than others. In this instance, if the user were to turn around or move in other than a predicted direction, they may see blackness and the extent of the light field would become apparent. However, since the computing device 402 is likely to be communicating many light fields per second it may keep up with the head motions and orientation of the user. In embodiments, this may become an issue if the network connection was interrupted and the user turned around.

In embodiments, a prediction may be used to set a density of light field points, where the density of the light field points may not be required to be uniform. For instance, this may enable a high density of points on a light field surface volume near predicted viewing vectors and a lower density of points in places such as behind the user if a fully enclosed volume is not provided.

In embodiments, a prediction may be used to set a FOV in combination with setting a resolution. For instance, if the head of a user is moving then the computing device 402 may translate the FOV towards the direction of motion and send light field data 410 adjacent to the current light field and adjust resolution to be higher in that direction.

In embodiments, a prediction may assist in generating light field data 410 for multiple head or viewing positions against a probability gradient of possible head or other positions based on the previous head or other position and any translational vector for the head or other position. For instance, probabilistic interpolation may be used to reduce the number of rays being transmitted proportional to the probabilistic location of a head or other position. In embodiments, the computing device 402 may address the network interruptions or jitter by allowing the virtual environment to allow for translational updates without an environmental update.

In embodiments, a prediction may be enhanced through machine learning to predict the need for light field data 410 as a user interacts with the environment scene or object(s), such as through the use of real time light tracing technology.

In embodiments, a prediction may be associated with a user being near, holding, or in contact with on object, such as in association with rendering or raytracing with respect to objects the user is holding onto or touching (such as through the user device 412). That is, the use of light fields may not only help to solve latency associated with the motion of the user or user device, but also with respect to hand or limb motion, to prevent or reduce latency with an object they are interacting with (e.g., the object doesn't move smoothly with a user's hand motion). Hand motion latency may not make the user sick, but it may reduce the user experience of immersion. In embodiments, the computer device may optimize for rending translations and rotations of the user device 412 with respect to objects the user is directly manipulating through the user device 412 to produce a low perceptual latency. For example, the computing device could be configured to predict (e.g. based on the user device location or field of view) the user is likely to interact with an object and on that basis, transmit a volume of light field data surrounding that object that is sufficiently large to accommodate hand translations or rotations of the object. In embodiments, the computing device may generate a light field for the volume surrounding the object, where the user device renders the object locally. In embodiments, the computing device 402 may provide object related light field data generation through (parallel) processing of light fields for multiple objects and performance requirements, stitching of multiple light fields into a single light field for interactions, and the like. For instance, the computing device 402 may maintain parallel processing for the surrounding scene and for a particular object. In other embodiments, the computing device may instead generate and transmit to the user device a light field volume for the volume environment or scene surrounding the object (i.e. a light field volume sufficiently large to exclude the object), while the user device is configured to render the object locally (e.g. by its own means).

As described herein, a light field is a vector function that describes the amount of light flowing in every direction through every point in space in a volume of space, such as in a data model for storing the light environment in that volume of space. The space of all possible light rays is given by the five-dimensional plenoptic function, and the magnitude of each ray is given by the radiance. With respect to geometric optics (e.g., to incoherent light and to objects larger than the wavelength of light) the fundamental carrier of light is a ray of light, such as depicted through ray tracking (such as depicted in FIGS. 6 and 7). The measure for the amount of light traveling along a ray is radiance, for example measured in watts per steradian per meter squared (m2). The steradian is a measure of solid angle, where $4\pi$ steradians represents a 'all view' volume (e.g., where an all view light field surface volume would provide visual information for all directions from the user/user device). The radiance along all light rays in a region of three-dimensional space illuminated by an unchanging arrangement of lights is called the plenoptic function. The plenoptic illumination function is an idealized function used in computer vision and computer graphics to express the image of a scene from any possible viewing position at any viewing angle at any point in time. Since rays in space may be parameterized by three coordinates, x, y, and z and two angles $\theta$ and $\phi$, the plenoptic function is a five-dimensional function. However, the plenoptic function contains redundant information, because the radiance along a ray remains constant from point to point along its length. After removal of the redundant information the light field becomes a four-dimensional function. Light fields may be generated by rendering image data or photographing a real scene (e.g., using a micro-lens array and interpolation between cameras/lens), producing light field views for a large number of viewpoints. The number and arrangement of images in a light field along with the resolution of each image may determine the sampling of the 4D light field. In embodiments, light fields may be stored in a file, such as with a '.lif' file format, which may be a single file to describe a light field, including a header section (e.g., with information regarding the number of slabs and spatial geometry) and a binary section (with the light field data).

In embodiments, as described herein, the computing device 402 may set the resolution or quality of a light field when communicating light field data 410, such as varying the amount of data on a surface volume. In theory there are an infinite number of rays that travel through a point in the light field (e.g., at a maximum resolution), then for lower resolution the computing device 402 may limit the number of rays, such as to, for example, 1000 of those rays and for even lower resolution to, say, 100 of the rays. In embodiments, this reduction in resolution may be applied to certain directions more than others, such as in setting a directional preference for high resolution. For example, a higher resolution may be set for the direction the user device 412 is facing or is predicted to face and lower to the sides and further lower behind the view of the user device 412. In embodiments, another resolution parameter may be the number of points per surface area (e.g., light field point density for a given surface volume) or included in a light field volume in the light field. In this way a light field point density may be specified and adjusted as a resolution parameter. As such, the rays per point may be optimized with respect to density, which may also be adjusted with respect to a location parameter, such as viewing direction (e.g., again, setting a higher density for directions the user device 412 is currently facing or anticipated to face). Further, the resolution may be specified for a portion of a view, such as in a directional optimization. As shown in FIG. 6, directional optimization may be applied to the light field based on a viewing perspective of the user device 412 because the user device 412 is only viewing a point from one of two sides of an object, where the generation of light field data 410 for the user device 412 may only need to be concerned with the rays of light leaving a subject of view and coming to the user device 412, not the rays in the direction to the subject. That is, generation of the light field data 410 may need to be focus on rays of light entering the volume, not leaving it.

In embodiments, resolution adjustments may be implemented through down-sampling or selection of traced rays in a light field to have a lower resolution light field than the infinite rays and infinite points that exists in the real world. However, if the number of light rays and/or the number of light field points is such that it is below the theoretical maximum (i.e. infinity), gaps may possibly exist between the rays and/or between the points for which blending and/or interpolation may be needed. In embodiments, blending and/or interpolation may be performed when the light field is generated (e.g., utilizing an optical transistor), when the light field is visualized (e.g., utilizing an optical receiver), and the like. In embodiments, dynamic resolution stitches may be present in the same light field, thus allowing for lower resolution light fields to exist in the same FOV as higher resolution light fields.

Referring to FIGS. 4, 5 and 8-10, the computing device 402, in association with the image processor 408, may provide a benefit to the user experience of viewing interactive visual content being delivered to the user device 412, where light field data 410 is provided to the user device 412 rather than transmitting video stream data and the like. This benefit is realized at least in part because light field data 410 may be processed more quickly to provide a display view to the user device 412 than if using other methods. For instance, a virtual reality user device needs only the light field data 410 to create the image for the display 520 of the user device 412, such as based on the position and direction of view of the user device 412. For a given position, the computing device 402 may compute and provide data associated with a light field surface volume of light field data 410, such as described by a grid of light field points and for every light field point in that grid (or an approximation of every point, such as though interpolation) determining a resolution for the number of light field points and how every ray of light goes through that light field point. In addition, the computing device 402 may set a volumetric size for each user device position (e.g., plus or minus 1 meter) so that there will be light field data 410 for positions around the user device location The result is a (streaming) transmission of a series of light field volumes of light field data 410 over time to the user device 412 corresponding to different positions of the user device 412. Thus, in some embodiments, the computing device 402 does not have to take into account the angle or direction of view of the user device 412 when generating light field data 410 since all needed angles and directions (as prioritized through directional preference) may be included in the light field data 410 for a given position of the user device 412. This in turn may improve the user experience by reducing the need for transmitted updates to the user device because the light field data 410 received by the user device contains information for a plurality of views, such as for movements within the light field volume.

In embodiments, light field data 410 may be generated with respect to image content, such as captured from a camera or series of cameras in still or video format, from a pre-recorded video file or from a real-time camera, and the like. Image content may be used to generate light field data 410 from a single view, multiple views, a full 360 degree view, a full $4\pi$ steradian view, and the like, in a single light field surface volume, multiple light field surface volumes, and the like. In embodiments, real-time image data may be captured by a camera or series of cameras and included in sensor data 406 to be used by the computing device 402 to generate light field data 410, such as where the camera(s) is mounted on the user device 412, communicatively coupled to the user device 412 (e.g., located proximate the user device), and the like. For example, a camera may be integrated into a VR, AR, or MR user device for viewing a surrounding environment, where the camera sends the image content from the camera to the computing device 402 for use in generating light field data 410 for use in a VR, AR, or MR interactive video experience. In embodiments, the camera my capture a partial (e.g., single or multiple camera) or full view (e.g., array of cameras) of the surrounding environment, enabling the computing device 402 to generate a corresponding light field data 410. For instance, in a full 360 degree camera view the computing device 402 may generate a full 360 degree light field view for communicating to the user device 412, permitting user device 412 to rotate around and display the surrounding scene as displayed through the light field data 410 without the computing device 402 needing to send additional light field data 410. In another example, a series or array of cameras located in the surrounding environment but separate from the user device 412 may be used to generate image content for communicating to the computing device 402 for generation of the light field data 410, such as where the image content is transferred to the computing device 402 through the user device 412, transferred to the computing device 402 through a network connection, and the like.

In embodiments, light field data may be generated from ray tracing based on a 3D environment or real-time video image content may be captured from camera(s) in one environment in order to generate light field data 410 for communication to a user device 412 in a second environment to provide a user of the user device 412 with a view of the first environment. For instance, a customer may wear a VR headset in order to be fully immersed in a remote store environment to replicate a physical instore experience, such as to place a user in a store where user can interact with sales people, and the like, take into account changes in the store, actions of sales people, and the like, in a dynamic real-time experience. In another instance, a customer may wear an AR or MR device to have a salesperson virtually 'enter the home' of the user, such as showing the user products and product demonstrations. In embodiments, the user and the sales person may utilize wearable user devices to interact together. In embodiments, the user device 412 may be a hand held smart phone or other mobile device that provides a virtual 'window' to the second environment, such as where the user experiences an interactive viewing window into a store through the smart phone display, and where sensors mounted on the smart phone, on the user, or in the user's environment provide sensor data 406 to the computing device 402 for generating light field data 410.

In embodiments, light field data 410 may be used to simulate a product interaction. For instance, a customer using a user device 412 may be able to interact with a product, such as either a real view of a product (e.g., in a store) or with a virtual product (e.g., computer generated). For example, light field data 410 may be generated for a product with high resolution for the product and low resolution for the area surrounding the product, high resolution for areas of the product a user is viewing or where a user is in contact with the product, and the like. In an example, the user may be wearing an AR or MR user device and view the product as an overlay onto the user's surroundings, where light field data 410 is dynamically generated to adjust resolution to the actions of the user as viewed through a camera on the user device 412 (e.g., the user device camera viewing the user's hand reaching out to the product and the light field resolution increasing for product area near the user's hand). In another example, the user device 412 may be a smart phone or other mobile device adapted to operate in an MR mode (e.g., through an application on the phone), and the light field data resolution dynamically increases as the user moves the phone 'closer to the product' in a virtual interaction with the product, where sensors in the smart phone send position and/or motion sensor data to the computing device 402 (e.g., along with any camera generated image content for any portion of the user viewed by the user device camera, such as where the user moves the phone forward to get closer to the product and also reaches in with a hand near the product—all with views changing as the smart phone translates and rotates).

In embodiments, light field data 410 may be used to provide a virtual service experience, where light field data 410 provides an improved real-time user experience through a more continuous immersive virtual experience. For instance, a user may virtually visit a museum in a foreign country through an AR, VR, or MR user device, where the user virtually walks through the museum, viewing the surroundings and exhibits, interacting with museum personnel and visitors, and the like, where light field data 410 is generated based on behavior (e.g., behavior of the user as viewed through a camera, behavior of the user device 412 a detected through position and/or motion sensor data, and the like), viewing FOV (e.g., adjusting the size of a light field volume and/or resolution based on a detected motion of the user device), interaction with objects and/or people (e.g., increasing resolution when a user is viewed through the user device camera to be coming near an object or area of interest), and the like.

In embodiments, light field data 410 may be used to view products and/or services at the location of the user device 412. For instance, with an AR or MR user device products, people, places, and the like, may be virtually brought into the home of a user, such as viewing products in a location where the product would go in the home (e.g., see a chair in a living room or a vase on a table), having a sales person provide a service in the home (e.g., teach a class on how to build a table in a user's workshop and the like), where the use of light field data 410 provides a consistent immersive user experience. In an example, a user may wear a head-worn AR user device to view an overlay of a new virtual couch on the background of the actual living room through light field rendering, allowing the user of the device to walk around the living room and view the virtual couch from any angle, seeing how it looks from different perspectives in the living room, and where the computing device 402 adjusts the light field data 410 based on the movements and perspective view of the user device 412. For instance, a user may bend down and look carefully at a back portion of the couch and the computing device 402 increases resolution around the area of interest on the couch. In this instance, because the user device 412 has a low probability for turning around in a direction opposite the couch, the computing device 402 may not provide light field data 410 behind the current view of the user device 412 (e.g., probability is high that the user will stay focused on the couch and not the rest of the room). In embodiments, a second user (e.g., a spouse) may operate a second user device 412 and the two user's devices may interact. Further, the computing device 402 may take advantage of overlapping views for the two user devices when generating the sensor data 406 for the two user devices.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include $4^{th}$ Generation (4G) networks (e.g. Long Term Evolution (LTE)) or $5^{th}$ Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method comprising:
   receiving, at a computing device, data acquired from a user device displaying virtual reality, augmented reality, or mixed reality content based on light field data using a display thereof, the data indicative of a current state of the user device, and wherein:
   the data indicative of the current state of the user device includes data indicative of a display field of view of the display and sensor data associated with the user device, the sensor data including position sensor data and/or motion sensor data, and
   the light field data includes light field data points defining a first three-dimensional volume;
   predicting, by the computing device, a behavior based at least in part on the received sensor data;
   generating, by the computing device based at least in part on the predicted behavior, further light field data for use in displaying the virtual reality, augmented reality, or mixed reality content at the user device, the further light field data including light field data points defining a second three-dimensional volume corresponding to a visual content greater than the display field of view of the user device; and
   sending the further light field data to the user device.

2. The method of claim 1, wherein the user device includes a head-mounted device and wherein the sensor data represents a motion of the head-mounted device.

3. The method of claim 1, wherein the user device includes a wearable device and the sensor data represents a motion of the wearable device.

4. The method of claim 1, wherein the user device includes a hand-held device and the sensor data represents a motion of the hand-held device.

5. The method of claim 1, further comprising:
   prior to receiving the data indicative of the current state of the user device, providing the first light field data to the user device, the first light field data including a first light field spatial volume,
   wherein a second light field spatial volume is adjusted in size based on the sensor data associated with the user device.

6. The method of claim 1, wherein the further light field data includes data for enabling the user device to display:
   a first field of view for a user in a first viewing perspective and a second field of view for the user in a second viewing perspective different from the first viewing perspective.

7. The method of claim 1, wherein the first or second three-dimensional volume of light field data points describes the light flowing in a plurality of directions through a plurality of light field data points.

8. The method of claim 1, wherein the first or second three-dimensional volume of light field data points is a partial volume with respect to a determined direction of motion of the user device.

9. The method of claim 1, wherein the light field data is based on a data model for light characterization in a volume of space.

10. A computer system comprising:
a processor; and
a memory storing instructions that, when executed by the processor, cause the computer system to:
receive data acquired from a user device displaying virtual reality, augmented reality, or mixed reality content based on light field data using a display thereof, the data indicative of the current state of the user device and including data indicative of a display field of view of the display and sensor data associated with the user device, the sensor data including position sensor data and/or motion sensor data, and
wherein the light field data includes light field data points defining a first three-dimensional volume;
predict a behavior based at least in part on the received sensor data;
generate based at least in part on the predicted behavior, further light field data for use in displaying the virtual reality, augmented reality, or mixed reality content at the user device, the further light field data including light field data points defining a second three-dimensional volume corresponding to a visual content greater than the display field of view of the user device; and
send the further light field data to the user device.

11. The computer system of claim 10, wherein the sensor data represents a motion of at least one head-mounted device, a wearable device, or a hand-held device associated with the user device.

12. The computer system of claim 10, wherein the instructions stored in the memory, when executed by the processor, further cause the computer system to:
prior to receiving the data indicative of the current state of the user device, provide the first light field data to the user device, the first light field data including a first light field spatial volume,
wherein a second light field spatial volume is adjusted in size based on the sensor data associated with the user device.

13. The computer system of claim 10, wherein the further light field data includes data for enabling the user device to display:
a first field of view for a user in a first viewing perspective and a second field of view for the user in a second viewing perspective different from the first viewing perspective.

14. The computer system of claim 10, wherein the first or second three-dimensional volume of light field data points describes the light flowing in a plurality of directions through a plurality of light field data points.

15. The computer system of claim 10, wherein the first or second three-dimensional volume of light field data points is a partial volume with respect to a determined direction of motion of the user device.

16. The computer system of claim 10, wherein the light field data is based on a data model for light characterization in a volume of space.

17. A non-transitory computer-readable storage medium storing instructions that, when executed by a processor of a computer system, cause the computer system to:
receive data acquired from a user device displaying virtual reality, augmented reality, or mixed reality content based on light field data using a display thereof, the data indicative of the current state of the user device and including data indicative of a display field of view of the display and sensor data associated with the user device, the sensor data including position sensor data and/or motion sensor data, and
wherein the light field data includes light field data points defining a first three-dimensional volume;
predict a behavior based at least in part on the received sensor data;
generate based at least in part on the predicted behavior, further light field data for use in displaying the virtual reality, augmented reality, or mixed reality content at the user device, the further light field data including light field data points defining a second three-dimensional volume corresponding to a visual content greater than the display field of view of the user device; and
send the further light field data to the user device.

18. The non-transitory computer-readable storage medium of claim 17, wherein the sensor data represents a motion of at least one head-mounted device, a wearable device, or a hand-held device associated with the user device.

19. The non-transitory computer-readable storage medium of claim 17, wherein the instructions, when executed, further cause the computer system to:
prior to receiving the data indicative of the current state of the user device, provide the first light field data to the user device, the first light field data including a first light field spatial volume,
wherein a second light field spatial volume is adjusted in size based on the sensor data associated with the user device.

20. The non-transitory computer-readable storage medium of claim 17, wherein the further light field data includes data for enabling the user device to display:
a first field of view for a user in a first viewing perspective and a second field of view for the user in a second viewing perspective different from the first viewing perspective.

* * * * *